(12) United States Patent
Scarcelli et al.

(10) Patent No.: US 12,019,018 B2
(45) Date of Patent: Jun. 25, 2024

(54) FULL-FIELD BRILLOUIN MICROSCOPY SYSTEMS AND METHODS

(71) Applicant: UNIVERSITY OF MARYLAND, COLLEGE PARK, College Park, MD (US)

(72) Inventors: Giuliano Scarcelli, Washington, DC (US); Romanus Hutchins, College Park, MD (US); Giulia Zanini, University Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 111 days.

(21) Appl. No.: 17/393,532

(22) Filed: Aug. 4, 2021

(65) Prior Publication Data

US 2022/0042908 A1  Feb. 10, 2022

Related U.S. Application Data

(60) Provisional application No. 63/061,104, filed on Aug. 4, 2020.

(51) Int. Cl.
*G01N 21/63* (2006.01)
*G02B 21/36* (2006.01)
*G02B 21/04* (2006.01)

(52) U.S. Cl.
CPC ......... *G01N 21/636* (2013.01); *G02B 21/361* (2013.01); *G01N 2021/638* (2013.01); *G02B 21/04* (2013.01)

(58) Field of Classification Search
CPC ...... G02B 21/16; G02B 21/361; G02B 21/04; G01N 2021/638; G01N 21/636
See application file for complete search history.

(56) References Cited

U.S. PATENT DOCUMENTS 6,307,626 B1 * 10/2001 Miles .................. G01J 3/44
356/301
8,115,919 B2 * 2/2012 Yun .................. G01J 3/4412
356/301

(Continued)

FOREIGN PATENT DOCUMENTS

WO    WO 2019/089531 A1    5/2019

OTHER PUBLICATIONS

Brookhyser et al., Laser-Processing Apparatus, Methods of Operating the Same, and Methods of Processing Workpieces Using the Same, Aug. 6, 2020, WO 2020/159666A1 (Year: 2020).*

(Continued)

*Primary Examiner* — Sang H Nguyen
(74) *Attorney, Agent, or Firm* — RowanTree Law Group, PLLC; Frederick F. Rosenberger

(57) ABSTRACT

A full-field microscopy method for detection of Brillouin-scattered light includes illuminating a two-dimensional plane in a sample with interrogating light having a first wavelength. Light emitted from the two-dimensional plane can be collected. The emitted light comprises Brillouin-scattered light resulting from interaction of the interrogating light with the sample. The Brillouin-scattered light can have a second wavelength shifted from the first wavelength. The collected light can be passed through a spectrally-selective assembly comprising a gas or vapor illuminated by pumping light. After the spectrally-selective assembly, the Brillouin-scattered light from multiple points in the two-dimensional plane in the sample can be simultaneously detected by an electro-optical sensor. In some embodiments, the spectrally-selective assembly can be altered by changing a wavelength or polarization of the pumping light to allow acquisition of a Brillouin spectrum.

25 Claims, 10 Drawing Sheets

(56) References Cited

U.S. PATENT DOCUMENTS

| | | | | |
|---|---|---|---|---|
| 2004/0027570 | A1* | 2/2004 | Caldwell | G01P 13/025 356/28 |
| 2014/0320863 | A1* | 10/2014 | Christensen | G01P 15/093 356/450 |
| 2017/0176318 | A1 | 6/2017 | Scarcelli et al. | |
| 2020/0187771 | A1 | 6/2020 | Yun et al. | |
| 2020/0278250 | A1 | 9/2020 | Scarcelli et al. | |

OTHER PUBLICATIONS

Ueno Hitosahi, Magnetic Field Measuring Apparatus, Jun. 6, 2013, JP 2013108833A. (Year: 2013).*

International Search Report and Written Opinion, dated Nov. 15, 2021, for International Application No. PCT/US21/44495. (15 pages).

Ballmann et al., "Stimulated Brillouin Scattering Microscopic Imaging," *Scientific Reports*, Dec. 2015, 5:18139. (7 pages).

Baumgart et al., "Scanned light sheet microscopy with confocal slit detection," *Optics Express*, Sep. 2012, 20(19): pp. 21805-21814. (10 pages).

Bouchard et al., "Swept confocally-aligned planar excitation (SCAPE) microscopy for high-speed volumetric imaging of behaving organisms," *Nature Photonics*, Feb. 2015, 9(2): pp. 113-119. (7 pages).

Cere et al., "Narrowband tunable filter based on velocity-selective optical pumping in an atomic vapor," *Optics Letters*, Apr. 2009, 34(7): pp. 1012-1014. (3 pages).

Dunsby, C., "Optically sectioned imaging by oblique plane microscopy," *Optics Express*, Dec. 2008, 16(25): pp. 20306-20316. (11 pages).

Keller et al., "Reconstruction of Zebrafish Early Embryonic Development by Scanned Light Sheet Microscopy," *Science*, Nov. 2008, 322(5904): pp. 1065-1069. (5 pages).

Kim et al., "High-resolution spectroscopy of rubidium atoms," *Jpn. J. Appl. Phys.*, Jul. 1993, 32(7): pp. 3291-3295. (5 pages).

Kumar et al., "Tilt-invariant scanned oblique plane illumination microscopy for large-scale volumetric imaging," *Optics Letters*, Apr. 2019, 44(7): pp. 1706-1709. (4 pages).

Liu et al., "Ultra-narrow bandwidth atomic filter based on optical-pumping-induced dichroism realized by selectively saturated absorption," *Optics Communications*, Mar. 2012, 285(6): pp. 1181-1184. (4 pages).

Nikolic et al., "Long-term Brillouin imaging of live cells with reduced absorption-mediated damage at 660 nm wavelength," *Biomedical Optics Express*, Apr. 2019, 10(4): pp. 1567-1580. (14 pages).

Popescu et al., "On the potential of Faraday anomalous dispersion optical filters as high-resolution edge filters," *Laser Physics*, Jan. 2005, 15(1): pp. 55-60. (6 pages).

Remer et al., "Background-free Brillouin spectroscopy in scattering media at 780 nm via stimulated Brillouin scattering," *Optics Letters*, Mar. 2016, 41(5): pp. 926-929. (4 pages).

Remer et al., "High-speed stimulated Brillouin scattering spectroscopy at 780 nm," *APL Photonics*, Jul. 2016, 1:061301. (7 pages).

Scarcelli et al., "Confocal Brillouin microscopy for three-dimensional mechanical imaging," *Nature Photonics*, Jan. 2008, 2(1): pp. 39-43. (5 pages).

Scarcelli et al., "Noncontact three-dimensional mapping of intracellular hydromechanical properties by Brillouin microscopy," *Nature Methods*, Dec. 2015, 12(12): pp. 1132-1134. (5 pages).

Thompson et al., "Precise Nanometer Localization Analysis for Individual Fluorescent Probes," *Biophysical Journal*, May 2002, 82(5): pp. 2775-2783. (9 pages).

Zhang et al., "Line-scanning Brillouin microscopy for rapid non-invasive mechanical imaging," *Scientific Reports*, Oct. 2016, 6:35398. (8 pages).

* cited by examiner

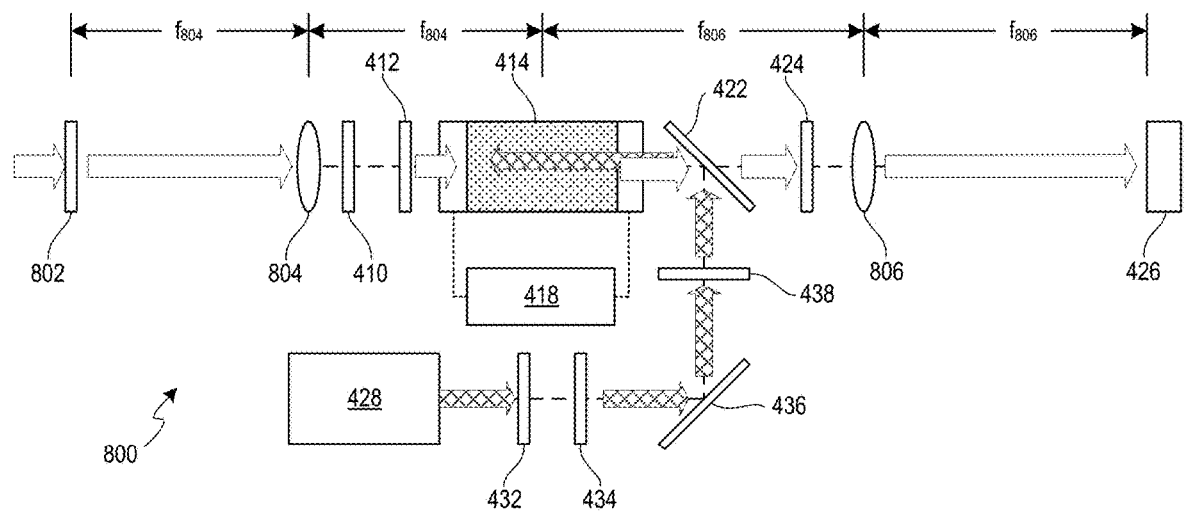
FIG. 11
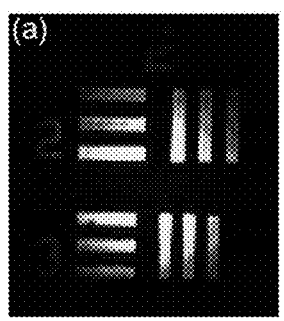 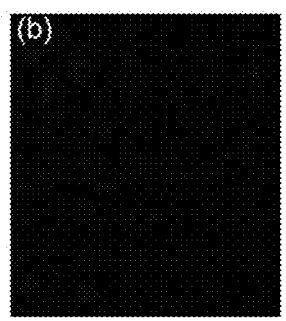 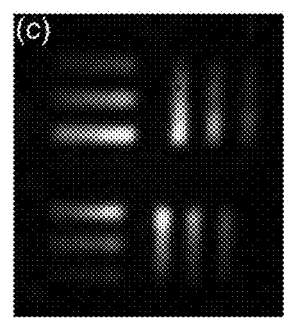 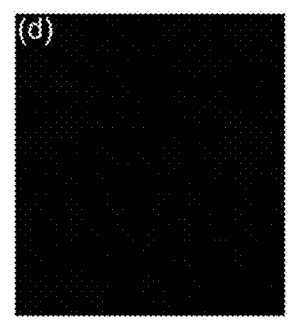
FIG. 12A     FIG. 12B     FIG. 12C     FIG. 12D

FULL-FIELD BRILLOUIN MICROSCOPY SYSTEMS AND METHODS

CROSS-REFERENCE TO RELATED APPLICATION

The present application claims the benefit of U.S. Provisional Application No. 63/061,104, filed Aug. 4, 2020, entitled "Systems and Methods for Full-field Brillouin Microscopy," which is incorporated by reference herein in its entirety.

STATEMENT REGARDING FEDERALLY SPONSORED RESEARCH

This invention was made with government support under DBI1942003 awarded by the National Science Foundation. The government has certain rights in the invention.

FIELD

The present disclosure relates generally to Brillouin microscopy, and more particularly, to systems and methods for full-field Brillouin microscopy.

BACKGROUND

Brillouin light scattering spectroscopy enables the non-invasive characterization of material properties through the measurement of acoustic phonons. But Brillouin scattering spectroscopy has been challenging from a measurement perspective because it requires both high spectral resolution to resolve optical frequency shifts on the order of 1-10 GHz and high spectral extinction to detect weak spontaneous Brillouin signatures next to non-shifted optical signals (e.g., $10^8$ times stronger than the Brillouin signals). The use of a double-stage virtually imaged phase array (VIPA) dramatically enhances the measurement by parallel spectral detection, which enables collection of the entire Brillouin spectrum at one time with sub-GHz resolution and high throughput efficiency.

FIG. 1 illustrates such a double-stage VIPA Brillouin light scattering spectrometer 154. The spectrometer 154 can include a first cylindrical lens 100, which receives light 122 from the sample. A first VIPA etalon 102 can be disposed at the focal plane of the first cylindrical lens 100. A second cylindrical lens 104 can be disposed behind the first VIPA etalon 102. The first VIPA pattern is thus observed at a focal plane 106 of the second cylindrical lens 104. The first VIPA pattern at plane 106 is then imaged via an imaging system comprised of spherical lenses 108, 112 and through a second VIPA etalon 110 onto a second focal plane 114. In each stage of the spectrometer 154, the VIPA etalon 102, 110 produces a spectrally dispersed pattern in the focal planes 106, 114 of the respective lenses 104, 112 placed just after the etalons. The spectrally dispersed pattern is the Fourier transform of the electromagnetic field at the output of each VIPA. In the double-stage spectrometer, the two spectral dispersion stages are cascaded orthogonally to each other and the planes 106, 114 of the respective spectrally dispersed patterns are conjugated. The image of the spectrally dispersed pattern is projected onto detector 158 (e.g., CCD camera) by imaging system 119, and a pattern is formed corresponding to the Brillouin signals 118.

Such double-stage VIPA spectrometers are capable of acquiring an entire Brillouin-scattered light spectrum in as little as 50 ms to 10 s. However, measuring larger areas remains difficult because point-scanning Brillouin microscopy is inherently limited in acquisition speed. Stimulated Brillouin scattering has been explored to reduce acquisition time, but it has been able to provide only modest improvements and requires high incident power, especially for time-lapse experiments on live biological samples. Embodiments of the disclosed subject matter may address one or more of the above-noted problems and disadvantages, among other things.

SUMMARY

Embodiments of the disclosed subject matter system provide a spectrally-selective assembly comprising a gas (or vapor) illuminated by pumping light corresponding to an atomic electron transition of the gas. Rather than relying on spatial separation to discriminate an entire Brillouin spectrum for a single point of the sample, the disclosed microscopy systems and methods take advantage of the narrow linewidth transmission (e.g., ≤200 MHz) characteristics resulting from the interaction of the pumping light with the gas to isolate Brillouin-scattered light collected from multiple points of the sample for subsequent detection. For example, the spectrally-selective assembly can comprise a laser-induced circular dichroism (LICD) filter, whereby illumination of the gas therein by the pumping light can change dichroism properties for wavelengths corresponding to a ground state or excited states of the gas. Polarization of Brillouin-scattered light at specific wavelengths can be changed by passing through the LICD filter, and one or more polarization optical components can be used to select for the changed polarization. A Brillouin spectrum can be obtained by tuning the transmission window of the LICD filter, for example, by changing the wavelength and/or polarization of the pumping.

The disclosed Brillouin microscopy systems and methods can push current limits of acquisition speed by providing for massively multiplexed spectral analysis. In particular, since all points of the collected light from the sample travel to the spectrally-selective assembly, they can be analyzed simultaneously. Thus, when integrated into the detection arm of a microscopy or imaging system, the spectrally-selective assembly can provide simultaneous analysis of Brillouin characteristics of all points within a field of view. Moreover, because the detection scheme is not based on the physical dispersion of light, the disclosed systems and methods can employ a light-sheet imaging train in the infinity space, for example, by matching relayed image size to gas cell active area and pump beam diameter (e.g., ~mm²). As compared to prior double-stage VIPA spectrometers, embodiments of the disclosed subject matter can achieve a significant reduction in the time required to acquire a Brillouin spectrum for multiple points, for example, by at least an order of magnitude.

In one or more embodiments, a full-field microscopy method for detection of Brillouin-scattered light can comprise illuminating a two-dimensional plane in a sample with interrogating light having a first wavelength. The method can further comprise collecting light emitted from the two-dimensional plane illuminated by the interrogating light. The emitted light can comprise Brillouin-scattered light resulting from interaction of the interrogating light with the sample. The Brillouin-scattered light can have a second wavelength shifted from the first wavelength. The method can also comprise passing the collected light through a spectrally-selective assembly comprising a gas or vapor illuminated by pumping light. The method can further comprise detecting, using an electro-optical sensor, light from the spectrally-selective assembly. The Brillouin-scattered light from multiple points in the two-dimensional plane in the sample can be simultaneously detected by the detecting.

In one or more embodiments, a full-field microscopy system for detection of Brillouin-scattered light can comprise a first light source, an illumination optical assembly, a detection optical assembly, and an electro-optical sensor. The first light source can provide interrogating light having a first wavelength. The illumination optical assembly can comprise one or more lenses, and the illumination optical assembly can be constructed to illuminate a two-dimensional plane in a sample with the interrogating light. The detection optical assembly can comprise one or more lenses and a spectrally-selective assembly. The detection optical assembly can be constructed to pass light emitted from the two-dimensional plane illuminated by the interrogating light through the spectrally-selective assembly. The emitted light can comprise Brillouin-scattered light resulting from interaction of the interrogating light with the sample. The Brillouin-scattered light can have a second wavelength shifted from the first wavelength. The spectrally-selective assembly can comprise a gas or vapor illuminated by pumping light. The electro-optical sensor can detect light from the spectrally-selective assembly. The Brillouin-scattered light from multiple points in the two-dimensional plane in the sample can be simultaneously detected by the electro-optical sensor.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows or solid/dashed lines rather than employing ray diagrams. Throughout the figures, like reference numerals denote like elements.

FIG. 11 shows an experimental setup for characterizing image transmission performance of a spectrally-selective assembly.

FIG. 12A shows a raw image of a resolution test chart obtained by the setup of FIG. 11.

FIGS. 12B-12C show images of the resolution test chart acquired by the setup of FIG. 11 without and with pumping light illumination of the spectrally-selective assembly, respectively.

FIG. 12D shows an image of the resolution test chart acquired by the setup of FIG. 11 with detuned pumping light illumination of the spectrally-selective assembly.

DETAILED DESCRIPTION

General Considerations

Figure 1:
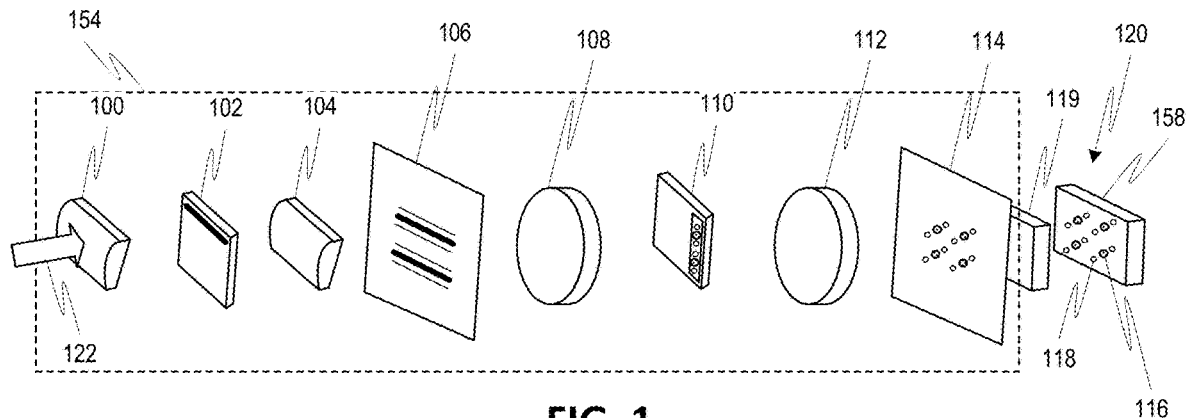
FIG. 1 is a simplified schematic diagram of a microscopy setup for detection of a Brillouin-scattered light spectrum from a single point.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those skilled in the art in the practice of the disclosed subject matter.

Light or optical: Electromagnetic radiation in the visible or near-infrared (NIR) regimes, e.g., having a wavelength between 380 nm and 2500 nm, inclusive.

Atomic Vapor Cell: A gas-tight enclosure having one or more optically-transparent windows and containing a single specific atomic element isotope its gaseous state (either as a pure gas or as a vapor), such as, but not limited to, Cesium (Cs), Potassium (K), Sodium (Na), or Rubidium (Rb), the electronic transitions of which can be used to provide narrow linewidth (e.g., ≤200 MHz) selection, as described herein.

Transmission Window: A single light frequency, or band of frequencies (e.g., ~200 MHz in width), that is allowed to pass through the atomic vapor cell with less reduction (e.g., transmission of at least 1%) as compared to other frequencies (e.g., outside of the band). In some embodiments, the transmission window can result in spectral extinction (e.g., reducing of out-of-band light as compared to in-band light) of at least 20 dB.

Introduction

In etalon-based spectrometers, light is dispersed along a spatial direction, for example, in a manner similar to that illustrated in FIG. 1. As such, analysis multiplexing can be limited and/or challenging. In addition, for cell or tissue applications, Brillouin spectroscopy requires spectral precision of ≤10 MHz. However, etalon-based spectrometers typically have resolutions of ~500 MHz, thereby requiring peak localization, which can increase acquisition time. In contrast, embodiments of the disclosed subject matter provide Brillouin microscopy systems that take advantage of gases illuminated by pumping light to provide spectral selection for Brillouin-scattered light passing therethrough, thus enabling massive multiplexing of spectral analysis. In addition, atomic gases (or vapors) feature electron transitions of ~MHz natural linewidths, which can provide high throughput and offer extreme frequency stability.

In some embodiments, a spectrally-selective assembly includes a laser-induced circular dichroism (LICD) filter, where illumination of the gas therein by the pumping light can change dichroism properties for wavelengths corresponding to a ground state or excited states of the gas. Polarization of Brillouin-scattered light at specific wavelengths can be changed by passing through the LICD filter, and one or more polarization optical components can be used to select for the changed polarization. A Brillouin spectrum can be obtained by tuning the transmission window of the LICD filter, for example, by changing the wavelength and/or polarization of the pumping.

In some embodiments, the spectrally-selective assembly supports full-field Brillouin analysis. Since all the points of the collected light from the sample travel to the same gas cell, they can be analyzed simultaneously. When integrated into the detection arm of a microscope or imaging system, the spectrally-selective assembly can thus provide simultaneous analysis of Brillouin characteristics (e.g., frequency shift, linewidth, or intensity of the Brillouin-scattered light) of all points within a field of view. In some embodiments, the sample is illuminated by a light sheet (e.g., to simultaneously illuminate a two-dimensional plane within the sample). Because the spectrally-selective assembly is not based on the physical dispersion of light, it can be integrated into a light-sheet imaging train in the infinity space, for example, by matching relayed image size to the active area of the spectrally-selective assembly (e.g., the active area of the gas cell thereof) and the pump beam diameter (e.g., ~$mm^2$).

Figure 2A:
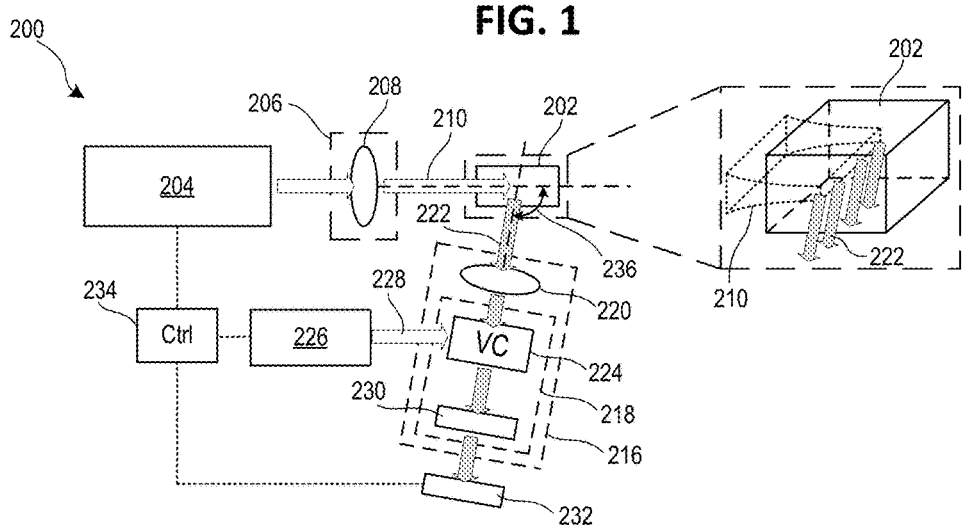
FIG. 2A is a simplified schematic diagram of a microscopy setup for full-field detection of Brillouin-scattered light, according to one or more embodiments of the disclosed subject matter.

For example, FIG. 2A shows an exemplary full-field Brillouin microscopy system 200 for interrogating a sample 202. The system 200 can include an interrogating light source 204 (e.g., laser emitting light having a first wavelength) that directs, via illumination optical assembly 206, interrogating light 210 onto the sample along a first optical axis. In some embodiments, the illumination optical assembly 206 forms the interrogating light into a hyperbolic sheet 210 of illumination (also referred to herein as a light sheet), to allow for simultaneous illumination of multiple points in the sample 202. The illumination optical assembly 206 can include one or more lenses 208 (e.g., microscope objective, etc.) configured to form a beam from the light source 204 into the light sheet.

The system 200 can include a detection optical assembly 216 that collects light 222 (e.g., Brillouin-scattered light) emitted from the sample along a second optical axis and directs the collected light to an electro-optical sensor 232 (e.g., a two-dimensional imaging detector, such as a charge-coupled device (CCD), complementary metal-oxide-semiconductor (CMOS) device, etc.) via spectrally-selective assembly 218. The spectrally-selective assembly 218 can include an atomic vapor cell 224 containing a gas (or vapor) illuminated by pump beam 228 from pumping light source 226 (e.g., laser emitting light having a second wavelength). In the simplified illustration of FIG. 2A, the light 222 is shown as being emitted only along the second optical axis; however, one skilled in the art will appreciate that Brillouin-scattered light is emitted in three-dimensions. In some embodiments, the angle 236 between the first and second optical axes can be selected for a particular wavelength of the Brillouin-scattered light to be collected by the detection optical assembly 216, for example, wavelengths that match those discriminated by the spectrally-selective assembly 218.

In some embodiments, the spectrally-selective assembly 218 can include one or more optical components 230 that work in combination with the atomic vapor cell 224 to select for a particular wavelength in the collected light 222 to be detected by the electro-optical sensor 232. For example, the wavelength of the pump beam 228 can be selected to substantially match a wavelength of Brillouin-scattered light to be detected and to substantially match an atomic electron transition of the gas within the atomic vapor cell 224, whereby illumination of the gas by the pump beam 228 can modify one or more optical properties of the gas (e.g., absorption, dichroism, polarization, birefringence, etc.) to select for the Brillouin-scattered light while other light is deselected (e.g., absorbed the gas or having a polarization blocked optical components 230), as described in further detail hereinbelow.

In some embodiments, the system 200 can include a controller 234 (or multiple control units that collectively may be referred to as a controller). The controller 234 can be operatively coupled to interrogating light source 204, pumping light source 226, and/or the electro-optical sensor 232. The controller 234 can be configured to control the operatively-coupled components to perform imaging and/or spectroscopic analysis of the sample. For example, the controller 234 can control the pumping light source 226 to change a wavelength and/or polarization of the pump beam 228 to alter a transmission window of the spectrally-selective assembly, thereby allowing collection of full-field Brillouin-scattered light at a different frequency. This tuning control of the pumping light source 226 can be repeated for multiple atomic electron transitions of vapor cell 224 to sweep through various frequencies (e.g., ~10-20 different frequencies within a range of ~500 MHz) for the collected light, thus enabling acquisition of a Brillouin spectrum. The ability to simultaneously analyze multiple points in the sample 202 (e.g., all points within a field of view, or a subset of one or some points, for example, as selected by a user) can lead to a significant reduction in acquisition times for Brillouin spectroscopy. For example, in some embodiments, an effective acquisition time per pixel per spectrum can be on the microsecond level (e.g., ~10 μs per pixel per wavelength or ~100-200 μs per pixel per spectrum).

In some embodiments, the controller 234 can process signals from the electro-optical sensor 232 indicative of light detected thereby (e.g., intensity values for each pixel in a two-dimensional array of pixels). For example, the controller 234 can extract at least one property from the acquired Brillouin spectrum for each point in the two-dimensional plane illuminated by the interrogating light 210. Such properties can include, but are not limited to, frequency shift, linewidth, and intensity of the Brillouin-scattered light. Alternatively or additionally, the controller 234 can form the detected intensity values and/or the extracted properties into an image of the sample.

In some embodiments, the controller 234 can interact with a user of the system 200 through an appropriate user interface (e.g., display, input/output device, etc.). For example, the controller 234 can display the results of the sample analysis via the user interface. Alternatively or additionally, in some embodiments, the controller 234 can accept commands for directing sample interrogation from the user via the user interface. For example, the user can select a region of the sample 202 for interrogation by the light sheet 210, or can change properties of the light sheet 210 (e.g., a beam width) to illuminate a subset of points of the two-dimensional plane within the sample 202 for analysis. Alternatively or additionally, the user can select a sub-region of the two-dimensional plane illuminated by light sheet 210 for collection. The controller 234 can change properties of detection optical assembly 216 (e.g., by controlling lens 220 or other optical components within the train between sample 202 and electro-optical sensor 232) to collect only light 222 emitted from the specified sub-region. Alternatively or additionally, the user can select a sub-region (e.g., one or some points, but less than all) of the two-dimensional plane illuminated by light sheet 210 for analysis. For example, the controller 234 can select data from pixels of the electro-optical sensor that corresponds to the selected sub-region for subsequent analysis, without otherwise modifying the illumination beam or collection configuration.

In some embodiments, the interrogating light sheet 210 and the emitted light 222 can be directed to/from the sample 202 via the same lens. Accordingly, although shown as separate lenses 208, 220, in some embodiments, a single lens can be provided for both the illumination optical assembly 206 and the detection optical assembly 216 (e.g., similar to the configuration illustrated in FIG. 5D). In such embodiments, the first and second optical axes would be coincident.

In some embodiments, the sample 202 is disposed on a translation stage, for example, to move the sample to allow interrogation of different regions, so as to form a three-dimensional image (or at least a three-dimensional data map) of the sample 202. Alternatively or additionally, components of the illumination optical assembly 206 and/or detection optical assembly 216 may be disposed on an appropriate translation stage to allow interrogation of different regions of the sample. Alternatively or additionally, illumination optical assembly 206 and/or detection optical assembly 216 can be provided with beam redirection components (e.g., scanning mirrors) that allow interrogation of different regions of the sample without relative translation between the sample and the optical assemblies.

Figure 2B:
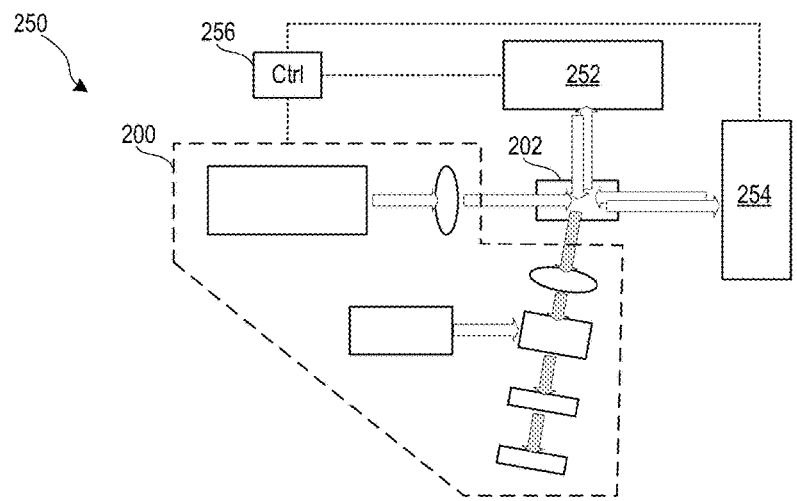
FIG. 2B is a simplified schematic diagram of a setup incorporating Brillouin microscopy with one or more additional imaging modalities, according to one or more embodiments of the disclosed subject matter.

In some embodiments, the full-field Brillouin microscopy system can be integrated with other microscopy modalities. For example, FIG. 2B illustrates a multi-modality microscopy system 250 including the full-field Brillouin microscopy system 200 of FIG. 2A and one or more additional microscopy modalities 252, 254. The additional microscopy modalities 252, 254 can employ any optical imaging or spectroscopy technique known in the art. For example, the optical imaging modalities can include, but are not limited to, reflectance imaging, brightfield imaging, fluorescence imaging, multi-photon imaging, phase contrast imaging, and differential interference imaging. For example, the spectroscopic modalities can include, but are not limited to, near-infrared (NIR) reflectance spectroscopy, Fourier-transform infrared (FTIR) spectroscopy, spontaneous Raman spectroscopy, stimulated Raman spectroscopy, and frequency comb spectroscopy. In some embodiments, the additional microscopy modalities comprise a light-sheet fluorescence microscopy system. For example, the integration of a light-sheet Brillouin microscope with co-localized light-sheet fluorescence (e.g., using 4',6-diamidino-2-phenylindole (DAPI) and/or green fluorescent protein (GFP) stains) can provide morphological information of cells, tissues, and biomaterials, and thus identify a desired volume for Brillouin imaging.

Spectrally-Selective Assemblies

Figure 3A:
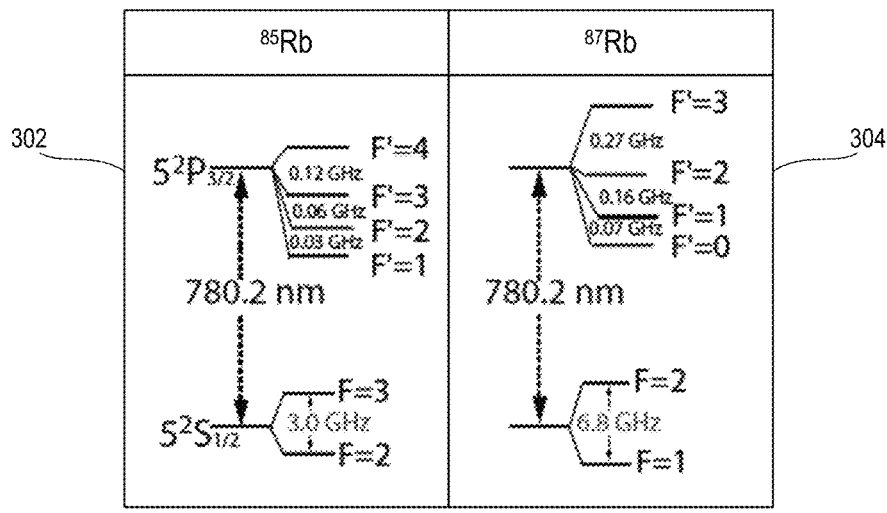
FIG. 3A shows electron transitions for isotopes of rubidium (Rb) gas, which can be exploited for spectral selection, according to one or more embodiments of the disclosed subject matter.
Figure 3B:
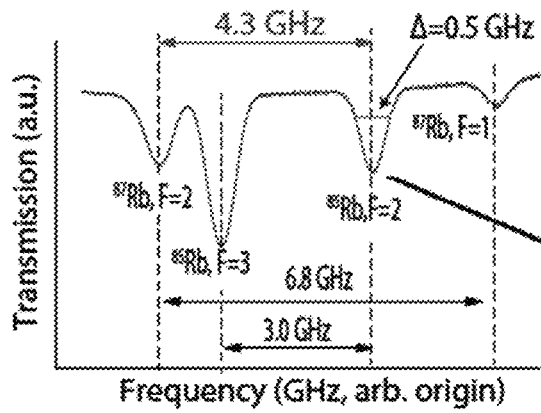
FIG. 3B is a graph of transmission versus frequency for isotopes of Rb gas.
Figure 3C:
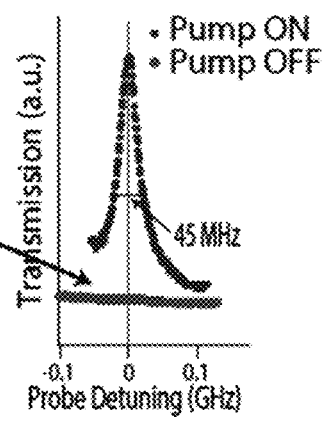
FIG. 3C is a graph of a transmission band of an Rb isotope gas with and without illumination by a saturating probe beam, according to one or more embodiments of the disclosed subject matter.

In embodiments, spectrally-selective assemblies employ a gas (or vapor) illuminated by pumping light to provide spectral selection for Brillouin-scattered light passing therethrough (also referred to as probe light or probe beam herein). FIG. 3A illustrates $D_2$ electron transition lines for isotopes of rubidium (Rb), in particular, $^{85}Rb$ (panel 302) and $^{87}Rb$ (panel 304). The Rb isotopes have narrow hyperfine transition lines, but generally absorb light in Doppler-broadened bands of ~500 MHz width (at room temperature) around 780 nm, as shown in FIG. 3B. If a high-intensity laser (also referred to herein as pumping light or pump beam) in resonance with a hyperfine transition is sent to the vapor cell, it will saturate that transition, thereby creating a transmission window for a counter-propagating weak probe beam. Such transmission bands (also referred to herein "Doppler-free" resonances) appear as dips in the Doppler-broadened spectrum, as shown in FIG. 3C. The saturated-transition dip is relatively narrow (e.g., ≤200 MHz, for example, ≤100 MHz or even less than ≤50 MHz), and can approach the natural linewidth of the transition (e.g., a few MHz) under ideal conditions. The transmission window defined by the narrow, saturated-transition dip can be used to select wavelengths of light for subsequent detection.

Figure 3D:
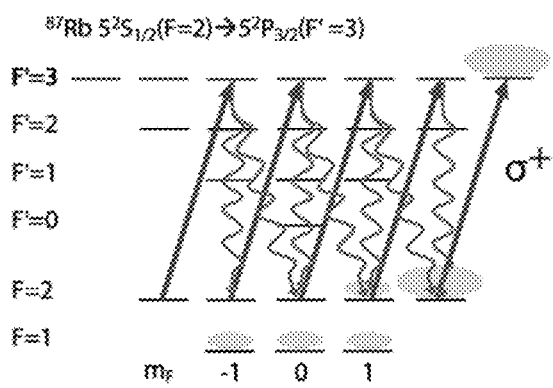
FIG. 3D illustrates saturation of a magnetic sub-level in $^{87}$Rb gas by a left-handed circularly polarized pump beam that creates a narrow circular dichroism feature in the gas, according to one or more embodiments of the disclosed subject matter.
Figure 3E:
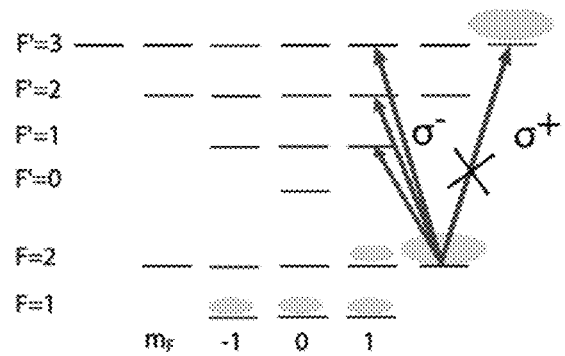
FIG. 3E illustrates transmission of light through $^{87}$Rb gas based on the circular dichroism feature of FIG. 3D.

Alternatively or additionally, in some embodiments, the spectral selection provided by the pump-illuminated gas relies on changes in dichroism properties. For example, a high-intensity pump beam with left-handed circular-polarization $\sigma^+$ can be used to selectively saturate a magnetic sub-level (with or without a biasing magnetic field), as shown in FIG. 3D. The pumping creates a narrow circular dichroism feature in the gas. As such, probe light having the same frequency as the pumping beam will be absorbed differently as it passes through the gas depending on its circular polarization. Thus, light having $\sigma^+$ polarization will be transmitted due to the saturation by the pumping, while light having $\sigma^-$ polarization will be absorbed, as shown in FIG. 3E.

The above-description is primarily directed to the ground state of atoms (e.g., the ground state of Rb isotopes). However, embodiments of the disclosed subject matter are not limited thereto. Rather, the above-disclosed principles can be applied to excited states as well as ground states. Indeed, since all electrons in the excited level are in the largest magnetic sublevel due to the pumping (e.g., as shown in FIG. 3D), absorption of light resonant with a transition between excited states (e.g., for Rb atoms, from $^5P_{3/2}$ to the higher $^5D_{3/2}$) will occur for $\sigma^-$ because no larger magnetic levels exist in the higher level. This phenomenon can create a circular dichroism feature (similar to the one described above for the ground state) that can be exploited for narrow transmission of Brillouin-scattered light. Compared to ground state operation, the transmission linewidth can be larger (e.g., ~400 MHz), and the transmission throughput can be lower (e.g., ≤10%), but importantly, in this scenario, the difference between the central wavelength of the pump beam and the central wavelength of the probe beam can be larger, since they target different transitions. Therefore, in some embodiments, narrow (e.g., "laser-line") spectral filtering elements and/or sharp long-pass filters can be used to suppress stray light from the pumping light source, if needed.

The Brillouin scattered light to be analyzed can be made to have linear polarization, which is a combination of $\sigma^-$ and $\sigma^+$ circular polarizations. Thus, when the Brillouin scattered light passes through the pump-illuminated gas, the Brillouin light polarization will be rotated, since only its $\sigma^-$ component is absorbed. By placing a polarizer orthogonal to the input polarization in the output optical path from the gas cell, only light whose polarization was rotated will go through the polarizer. This results in a narrow transmission filter (e.g., of MHz bandwidth, comparable to Doppler-free lines) that can achieve ≥20% throughput and can reject out-of-band (also referred to as spectral extinction) light by at least ~20 dB (e.g., ~32 dB).

When the pump and probe beams are off resonance, they address different atoms depending on their velocity. In contrast, when the pump and probe beams are on resonance, they both address those atoms traveling orthogonal to the laser propagation direction. As a result, the LICD filter transmission depends upon the number of atoms of a particular velocity class interacting with the beams. The number of atoms of a specific velocity class f(v) can be calculated using the Boltzmann velocity distribution equation $$f(v) = \left(\frac{m}{2\pi kT}\right)^{3/2} e^{\left(\frac{-mv^2}{2kT}\right)},$$

where v is the velocity, m is the mass of the atom, k is the Boltzmann constant, and T is temperature. Increased temperature (e.g., via supplemental heating) can increase the number of gas atoms (e.g., Rb) that interact with the beams, thus increasing transmission of the LICD filter. Alternatively or additionally, the number of gas atoms that interact with the pump and probe beams can be increased by increasing the pressure of the gas and/or by increasing a length of the gas volume (e.g., in a direction along which the pump and probe beams propagate). The probe beam will only be transmitted through the LICD filter when the pump beam is powerful enough to saturate the transition where the probe beam is locked. A decrease in pump beam intensity at one end of the gas cell to a level below transition saturation can lead to a decrease in probe beam transmission at an opposite end of the gas cell.

In some embodiments, the pump and probe beams may not be counterpropagating. Rather, they can co-propagate or intersect at an angle. So long as the photons of the probe beam can interact with atoms that have interacted with the pump beam, the directions of propagation of the pump and probe beams can have any of various orientations with respect to each other. For example, if stray light from pump beam back-reflection is a concern, a gas cell in which the pump beam is expanded and inserted orthogonally to the direction of the probe beam can be provided (e.g., similar to the configuration of FIG. 4D).

In some embodiments, the use of an LICD filter as part of a spectrally-selective assembly can allow for massive multiplexing. In particular, as noted above, since all the points of a beam can be analyzed simultaneously, the LICD filter can provide simultaneous analysis of Brillouin characteristics of all points within a field of view when placed within a detection arm of a microscope train (and with proper optics consideration). A full Brillouin spectrum can be obtained by sweeping the frequency of the pump beam in a full Doppler-broadened width (~500 MHz for Rb $D_2$ lines) of the gas, thus moving the central frequency of the LICD transmission filter. In some embodiments, the light source for the pump beam can be any type of wavelength-swept laser, and the frequency of the pump beam can be tuned by appropriate control of the laser, for example, by using a piezoelectric element to alter properties of a resonating cavity of the laser (e.g., by modifying a diffraction grating and/or changing cavity length).

Alternatively or additionally, in some embodiments, different transition lines within the gas can be used to match a desired probe beam frequency (e.g., a Brillion-scattered light wavelength), obtain different Brillouin spectra, and/or optimize spectrometer performance for a particular application or sample. Alternatively or additionally, in some embodiments, the naturally-occurring transition lines of the gas can be modified, for example, by using an applied magnetic field to move the atomic electron levels to match a desired probe beam frequency or frequencies. Alternatively or additionally, in some embodiments, different gases (or vapors) can be substituted into a spectrally-selective assembly and the pump beam tuned to transition lines therein (or replaced with a different light sources whose emission wavelength matches the transition line of the substituted gas) to match a desired probe beam frequency, obtain different Brillouin spectra, and/or optimize spectrometer performance for a particular application or sample. For example, the spectrally-selective assembly can employ a filter wheel and/or switching prisms to select between cells having different gases therein.

In some embodiments, a sweeping range of the pump beam and the LICD filter can be centered at the Brillouin shift of the sample. For example, an interrogating beam that illuminates the sample can be locked within the $^{85}$Rb F=2 band, while the LICD filter (and the corresponding pump beam) can be swept within the $^{87}$Rb F=2 band, thereby yielding a range of 4-4.5 GHz in frequency shifts, as shown in FIG. 3B. The collection angle (e.g., the angle that the optical axis of the detection arm makes with respect to the optical axis of the illumination arm) for the probe beam provided to the spectrally-selective assembly can be tuned to capture the specific Brillouin-scattered light from the sample that corresponds to the LICD filter wavelength. For example, the 4-4.5 GHz sweeping range within the $^{87}$Rb F=2 band can be matched upstream by tuning the central shift of the Brillouin scattered light using a collection angle of the detection of ~96°.

Figure 4A:
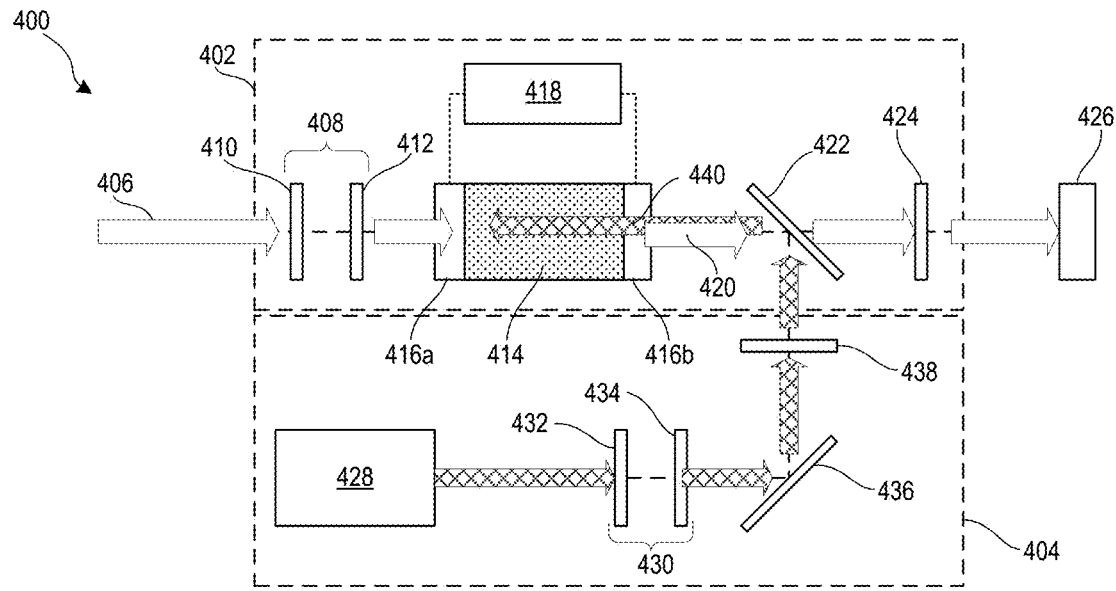
FIG. 4A shows an exemplary detection arm employing a spectrally-selective assembly for use in a Brillouin microscope, according to one or more embodiments of the disclosed subject matter.

FIG. 4A illustrates an exemplary detection arm configuration 400 that employs an LICD filter within spectrally-selective assembly 402. For example, the spectrally-selective assembly 402 can include one or more input polarization optical components 408, such as a half-wave plate 410 and a Glan-Taylor polarizer 412. The spectrally-selective assembly 402 can also include one or more output polarization optical components, such as linear polarizer 424. Between the input and output polarization optical components, an atomic vapor cell 414 can be disposed in the optical path. Ceramic heaters 416a, 416b thermally coupled to the atomic vapor cell 414 (e.g., at input and output windows thereof, respectively) and powered by heater controller 418 can be used to heat the gas within the atomic vapor cell 414 to a desired temperature (e.g., 80° C. for Rb).

The atomic vapor cell 414 can be illuminated by circularly-polarized pump beam 440 from pumping setup 404. For example, the pumping setup 404 can include a laser source 428, one or more first polarization optical components (such as half-wave plate 432 and linear polarizer 434), a mirror 436 (or other redirecting optical component), and one or more second polarization optical components (such as quarter-wave plate 438), so as to generate the circularly-polarized pump beam input to the spectrally-selective assembly 402. The circularly-polarized pump beam 440 can be directed through the atomic vapor cell 414 in a direction counter-propagating to and substantially colinear with the probe beam 406 by a beam splitter 422 (e.g., a 10:90 (R:T) beam splitter).

In operation, the probe beam 406 propagates through half-wave plate 410 and then becomes linearly polarized through Glan-Taylor polarizer 412. In this polarization scheme, the half-wave plate 410 can be used to control the power of the probe beam 406 at the vapor cell 414. The pump beam from laser source 428 can be transmitted through a beam attenuator 430 in the form of a half-wave plate 432 and linear polarizer 434. The pump beam from the attenuator 430 is reflected by mirror 436 into quarter-wave plate 438 so as to create the left circularly polarized ($\sigma^+$) pump beam. The $\sigma^+$ pump beam 440 is then reflected by beam splitter 422 and superimposed onto the probe beam 406 at a 180° angle within the vapor cell 414. Since the pump beam 440 is tuned in frequency and intensity to saturate a specific electron transition of the gas within the vapor cell 414, a narrow-waveband, transparent window in the vapor cell 414 is created for the component of the probe beam 406 at the same frequency and polarization as the pump beam. Thus, when in resonance, the linear polarization of the probe beam 406, which can be considered as a sum of right ($\sigma^-$) and left ($\sigma^+$) circular polarizations, will rotate. The probe beam is then transmitted by the beam splitter 422 and is filtered by linear polarizer 424 in crossed configuration with the Glan-Taylor polarizer 412, ensuring that only light output by the atomic vapor cell 414 is transmitted and detected by electro-optical sensor 426.

In some embodiments, the spectrally-selective assembly 402 can further include a notch filter to clean up the light signal (e.g., the Brillouin signal) from stray and/or unshifted light (e.g., interrogating light) prior to detection by electro-optical sensor 426. For example, the use of an 85Rb gas cell as a notch filter can provide an additional 40 dB rejection (or spectral extinction) and has a low insertion loss of ~5%. Such a notch filter can be provided at any point along the optical train between the collection optics and the electro-optical sensor 426, for example, prior to the polarization optical elements 408.

Figure 4B:
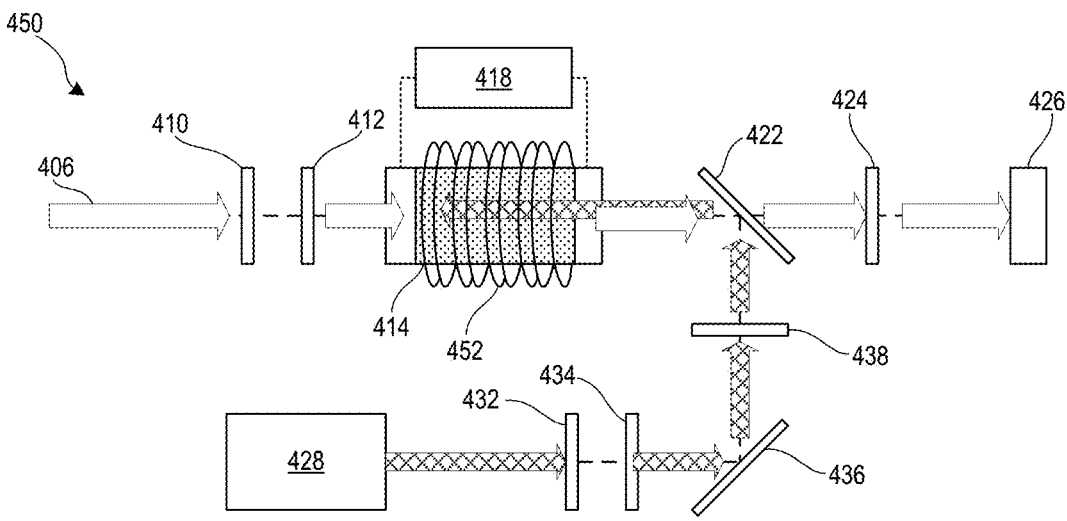
FIG. 4B shows another exemplary detection arm employing a spectrally-selective assembly with a solenoid for transmission tuning, according to one or more embodiments of the disclosed subject matter.

As discussed above, changing a frequency of the pump beam 440 (e.g., to saturate a different electron transition of the gas within the vapor cell 414) can select for a different frequency in the probe beam 406 by defining a different transmission window through the vapor cell 414. Alternatively or additionally, in some embodiments, the electron transitions of the gas within the vapor cell 414 can be modified to change frequencies corresponding thereto. In some embodiments, an externally-applied magnetic field can be applied to the atomic vapor cell, for example, in a manner similar to that employed in Faraday anomalous dispersion optical filters (FADOF). For example, FIG. 4B illustrates an exemplary detection arm configuration 450 that uses a solenoid 452 wrapped around vapor cell 414 to apply a magnetic field to the gas therein. Other mechanisms and configurations for applying transition-altering magnetic fields are also possible according to one or more contemplated embodiments.

In some embodiments, the frequency of the LICD filter (e.g., vapor cell) of the spectrally-selective assembly is not swept across the whole Brillouin peak. Rather, a small amount of frequencies can be analyzed (even only a single frequency) in such a way that the LICD filter works as a narrow bandpass filter and the intensity at each pixel corresponds to a given shift of the Brillouin peak—a technique known as slope-assisted spectroscopy or single-shot gradient-assisted spectroscopy. Such a technique can achieve the fastest acquisition time because the full Brillouin image is collected in a single shot, but may require prior calibration of intensity versus frequency behavior as well as greater rejection of stray laser light.

The provision of the pump beam 440 within the atomic vapor cell 414 counter-propagating to and colinear with probe beam 406 can result in back-reflection (e.g., at vapor cell window adjacent to the heater 416b). Since the pump beam 440 may be significantly more intense than the probe beam 406 (e.g., at least $10^8$ greater), such back-reflection may otherwise obscure detection of the probe beam by electro-optical sensor 426. In some embodiments, the windows (e.g., output window adjacent heater 416b, input window adjacent heater 416a, or both) of the atomic vapor cell 414 can be provided with anti-reflection coatings, so as to avoid, or at least reduce, any such back-reflection.

Figure 4C:
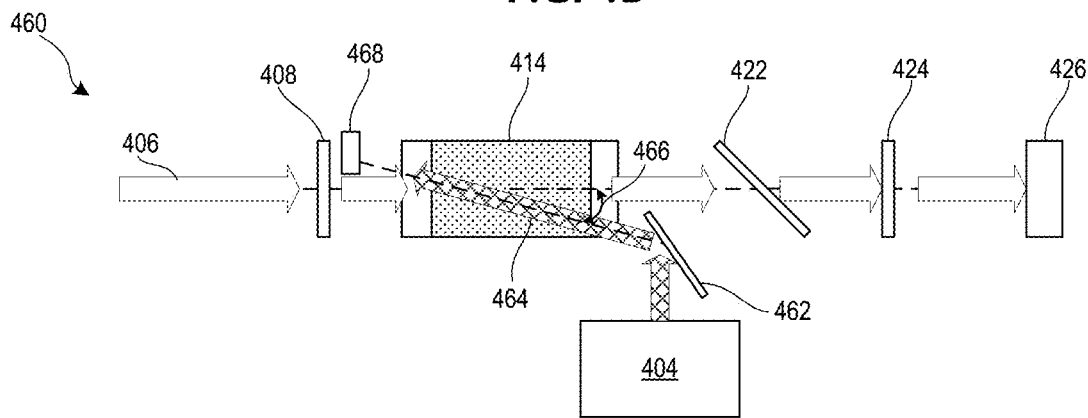
FIG. 4C shows another exemplary detection arm employing a spectrally-selective assembly with skewed pumping configuration, according to one or more embodiments of the disclosed subject matter.

Alternatively or additionally, in some embodiments, the propagation directions of the pump and probe beams can be offset from each other. For example, FIG. 4C illustrates an exemplary detection arm configuration 460 where a pumping setup 404 generates a circularly polarized pump beam 464 directed through the atomic vapor cell 414 by a mirror 462. In particular, the pump beam 464 is directed at an angle 466 (e.g., ≥2°) offset from the propagation direction of the probe beam 406. In some embodiments, the positioning of the pump beam 464 within the vapor cell 414 and/or the size of the pump beam 464 can be such that the probe beam 406 substantially overlaps with the pump beam 464 as it propagates from an input end of the vapor cell 414 to the output end of the vapor cell 414. For example, a beam width of the pump beam 464 can be larger than a beam width of the probe beam 406. In some embodiments, a beam block 468 can be disposed to absorb or otherwise block the pump beam 464 that exits the vapor cell 414.

Figure 4D:
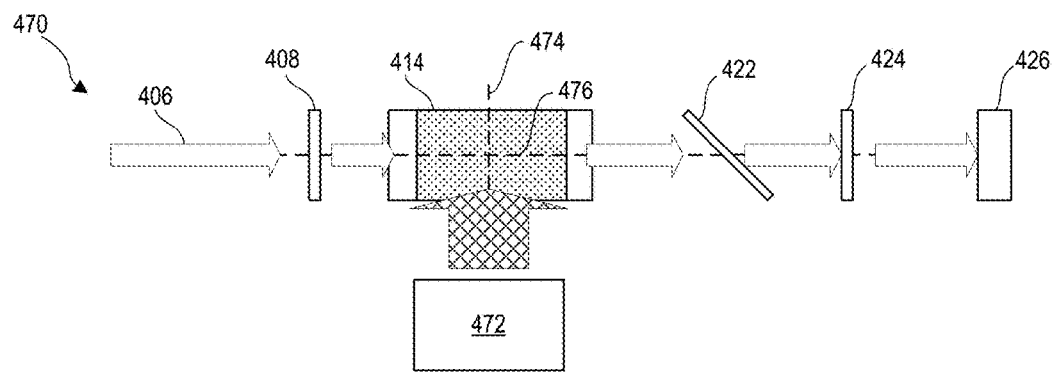
FIG. 4D shows another exemplary detection arm employing a spectrally-selective assembly with orthogonal pumping configuration, according to one or more embodiments of the disclosed subject matter.

Alternatively or additionally, in some embodiments, the propagation directions of the pump and probe beams can be orthogonal to each other, for example, where the transmission window through the vapor cell relies primarily on absorption rather than polarization effects. For example, FIG. 4D illustrates an exemplary detection arm configuration 470 where a pumping setup 472 generates a pump beam directed along axis 474, which is substantially perpendicular to a propagation direction 476 of the probe beam 406 through the vapor cell 414. In some embodiments, the positioning of the pump beam within the vapor cell 414 and/or the size of the pump beam can be such that the probe beam 406 substantially overlaps with the pump beam as it propagates from an input end of the vapor cell 414 to the output end of the vapor cell 414.

Brillouin Microscopy Systems

Figure 5A:
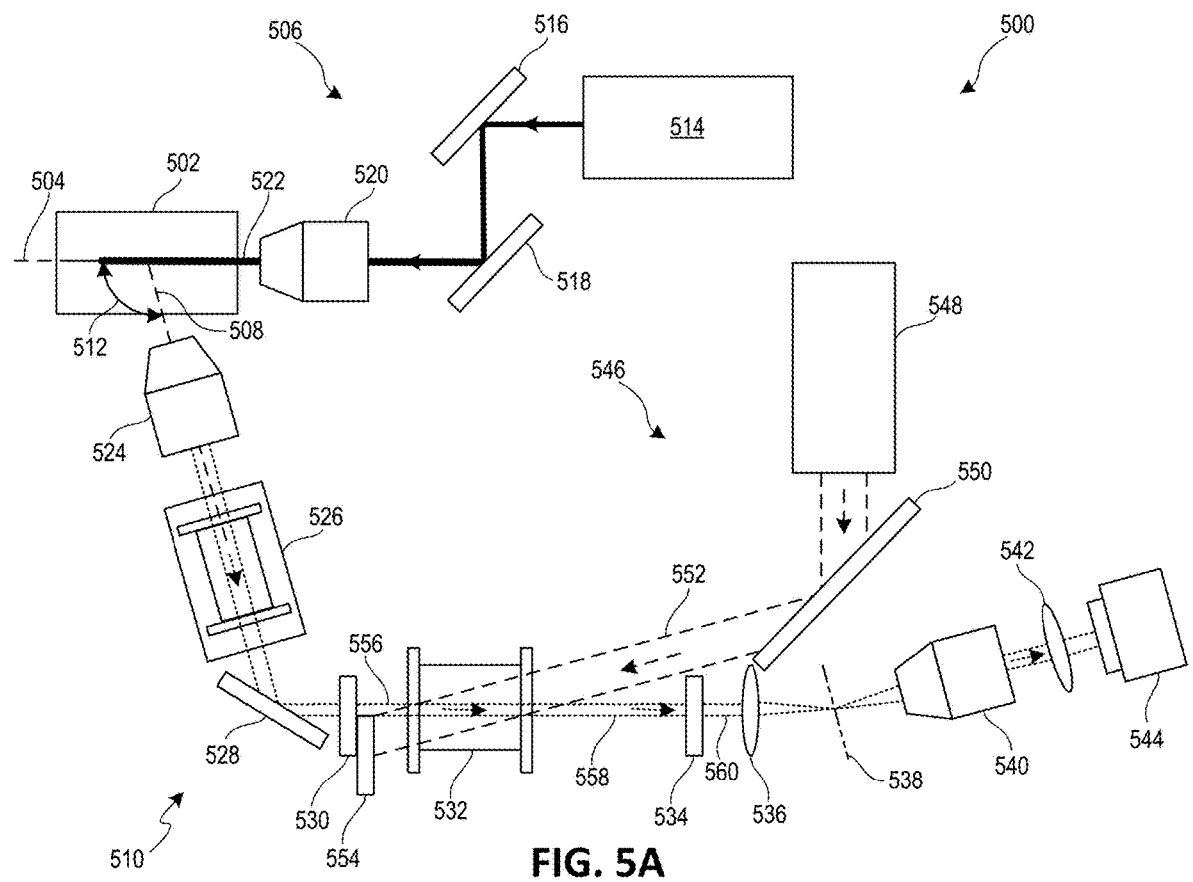
FIG. 5A shows an exemplary full-field Brillouin microscope system, according to one or more embodiments of the disclosed subject matter.

FIG. 5A illustrates an exemplary microscope system 500 for performing full-field Brillouin microscopy. The system 500 can include an illumination optical assembly 506, a detection optical assembly 510, a pumping optical assembly 546, and an electro-optical sensor 544. For example, the illumination optical assembly 506 can include a light source 514 (e.g., laser emitting a first wavelength), a pair of mirrors 516, 518, and a microscope objective 520. The illumination optical assembly 506 can generate a light sheet 522 directed along illumination optical axis 504 to illuminate a two-dimensional plane in the sample 502. For example, the detection optical assembly 510 can include a detection objective 524 arranged to collect light emitted from the sample 502 along a detection optical axis 508, which is at an angle 512 with respect to the illumination optical axis 504 corresponding to a desired frequency of the Brillouin-scattered light to be detected. The detection optical assembly 510 can further include an atomic vapor cell 532 illuminated by pumping light 552 from the pumping assembly 546, so as to define a narrow transmission. Thus, the system 500 combines a light-sheet microscopy configuration with the tunable narrow spectrally-selective assembly (e.g., as described above) for multiplexed Brillouin analysis.

In operation, the wavelength of light source 514 to be used for Brillouin imaging can be locked at a hyperfine transition inside the $^{85}$Rb (F=3) band and can be reflected by mirrors 516 and 518 into microscope objective 520. The Brillouin signal can be collected on the opposite side of the sample 502 at an angle 512 of ~96° by detection objective 524. The collected light can be transmitted through a notch filter 526 (e.g., $^{85}$Rb vapor cell) to remove stray light components at the frequency of the interrogating light 522. The light from notch filter 526 can then be reflected by a mirror 528 into a Glan-Taylor polarizer 530 and then into an $^{87}$Rb vapor cell 532. An intense saturating pump beam 552 (e.g., having an intensity at least $10^8$ greater than the Brillouin-scattered light), from pump light source 548 (e.g., laser emitting a second wavelength corresponding to a wavelength of the Brillouin-scattered light) can be reflected by a mirror 550 into the $^{87}$Rb vapor cell 532 in order to create the LICD filter at the Brillouin frequency. For example, the pump beam 552 can be locked at a frequency inside the $^{87}$Rb (F=2) band. The pump beam 552 can overlap with the light 556 (e.g., having the Brillouin-scattered light emitted from the sample) at an angle >2° to avoid back reflection into the electro-optical sensor 544. A beam block 554 can be provided to block any pump light 552 that may exit the vapor cell 532. The Brillouin signal 558, whose polarization is rotated, propagates through a second Glan-Taylor polarizer 534 in crossed configuration with respect to 530. The light 560 is then focused by a lens 536 into an oblique imaging plane 538, collected by an objective lens 540, and collimated by a tube lens 542 onto electro-optical sensor 544 (e.g., a scientific CMOS (sCMOS) camera) for imaging.

In some embodiments of the microscope system, an equivalent line illumination numerical aperture (NA) of 0.02 for ~mm field of views (FOVs) and a matched collection NA of ~0.25 can be used. In some embodiments, rolling shutter techniques and/or scanned line illumination techniques can be used to increase efficiency and/or increase out-of-focus rejection. To match the transmission band of the LICD filter (e.g., vapor cell 532), Brillouin light can be collected at 96°. As a result, the microscope 500 has an oblique relay imaging plane 538. Such tilted collection may lead to long imaging prep protocols if the angle needs to be often tuned to match the spectral band. However, angle adjustment has been studied extensively in the light-sheet field, and conventional solutions developed in the light-sheet field can be employed in embodiments of the disclosed subject matter. Indeed, since the disclosed spectral discrimination is in the infinity space of the microscope and does not rely on physical dispersion of light, all methods developed for light-sheet microscopy can be employed in the disclosed systems.

To quantify the performance for the microscopy system 500, for a 3D volume of 256×256×20 pixels, the disclosed spectrally-selective techniques provide the parallelization advantage of selective plane versus point illumination of 256×19-fold (e.g., multiplexed pixels along illumination direction x multiplicity of planes re-illuminated by confocal) but a disadvantage of 16-fold (e.g., frequency components to scan versus a VIPA single-shot measurement), thereby resulting in ~300-fold improvement. To this parallelization factor, considerations of efficiency of the spectrometer (e.g., per single frequency) and Brillouin illumination/collection (e.g., per single point) can be added. A key parameter to evaluate Brillouin spectrometers is the sensitivity in longitudinal modulus, δM'/M', determined by the spectral precision δΩ. Both etalon-based and the disclosed full-field Brillouin spectrometers operate in shot-noise regime, thus $$\delta\Omega = \frac{\sqrt{\Delta_B^2 + \Delta_{NA}^2 + \frac{p^2}{12} + r^2}}{SNR},$$

with $\Delta_B$ Brillouin linewidth, $\Delta_{NA}$ NA-line broadening, p, pixel spectral dispersion, and r, spectral resolution. NA-line broadening is similar, with pixel spectral dispersion being ~5 times narrower in the LICD technique. The Brillouin linewidth is twice smaller for the quasi-perpendicular LICD technique, and spectral resolution is >10-fold smaller (e.g., 0.6 GHz in VIPA, 0.045 GHz in LICD). Signal-to-noise ratio (SNR) is proportional to $\sqrt{N}$, where N is the number of detected photons. Thus, SNR is proportional to acquisition time (e.g., since spectrometer throughputs are similar, ~20%). Overall then, the LICD technique can achieve the sensitivity of VIPA spectrometers, but with ~16-fold better acquisition time.

The overall signal power can be written as $P=I_{ill}V\Phi R$, with $I_{ill}$, illumination intensity; V, interaction volume (per acquisition point); Φ, collection solid angle and R, scattering coefficient (same for two schemes). In a light-sheet scheme, the interaction volume is the cylinder intersection of illumination and collection beams $$\left(\text{radius } \frac{0.61\lambda}{NA_{coll}}, \text{length } \frac{0.61\lambda}{NA_{ill}}\right).$$

For epi-configuration, interaction volume is $$\sim \frac{0.61^2 \lambda^3}{NA_{epi}^4}.$$

The solid angle scales with collecting NA in both schemes $\sim \pi NA_{coll\ or\ epi}^2$. Thus, the signal power is $$P_{LS} = I_{ill} R \frac{0.61^3 \pi^2 \lambda^3}{NA_{ill}}$$

in light-sheet versus $$P_{CONF} = I_{ill} R \frac{0.61^2 \pi^2 \lambda^3}{NA_{epi}^2}.$$

For the same illumination intensity, the ratio of the two schemes is $$\frac{0.61 NA_{epi}^2}{NA_{ill}}.$$

This comparison uses $NA_{epi}$ of 0.1 (for same lateral resolution) and light-sheet equivalent $NA_{ill}$ of 0.02. Thus, the light-sheet scheme has ~3-fold worse efficiency. However, the disclosed LICD technique can improve acquisition times by >1,500 times over state-of-the-art etalon spectrometers. If frequency is not swept (e.g., using slope-assisted measurement to obtain the Brillouin spectrum), the LICD technique can yield up to an extra 16-fold enhancement.

Figure 5B:
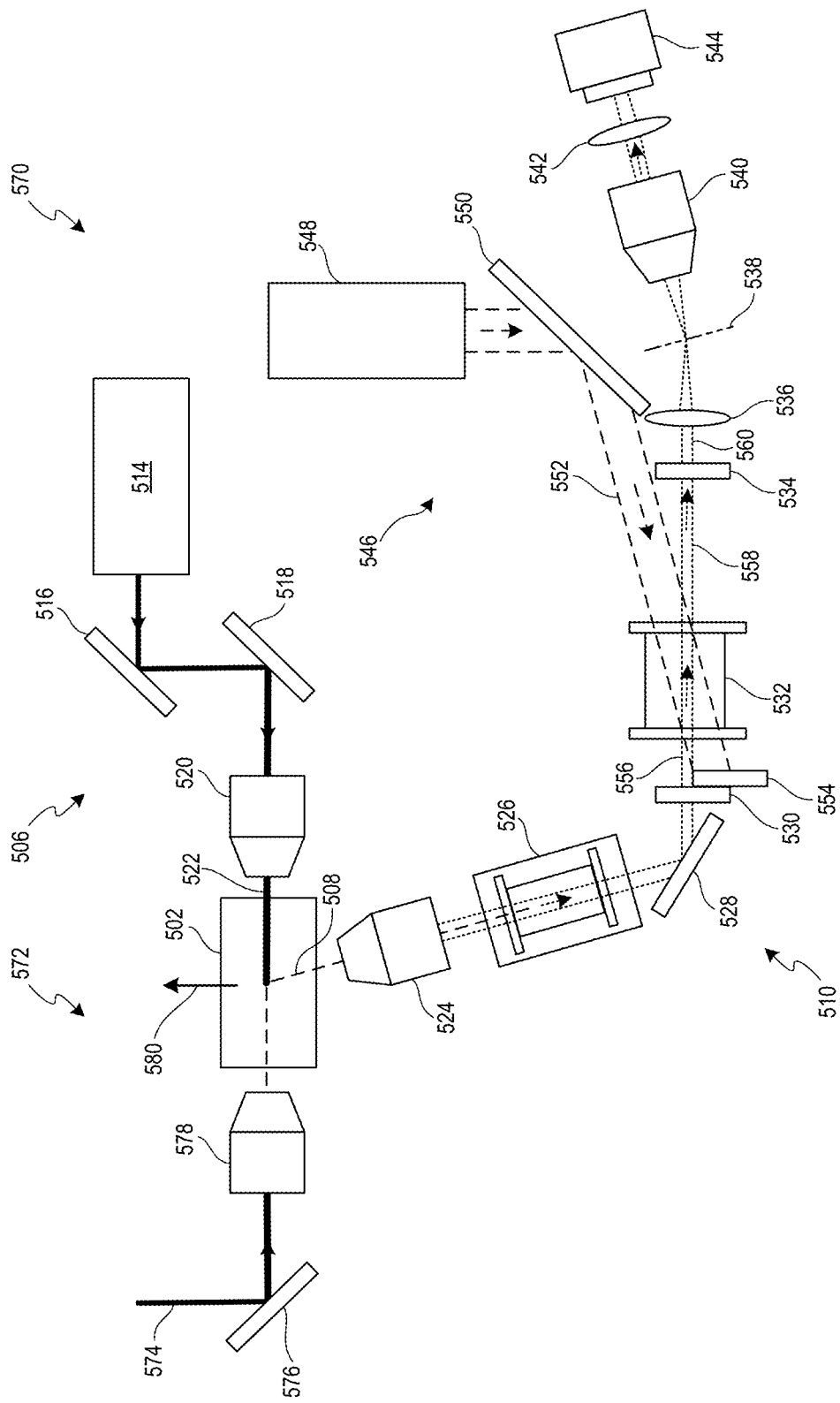
FIG. 5B shows an exemplary microscope system employing a full-field Brillouin and fluorescence imaging modalities, according to one or more embodiments of the disclosed subject matter.

In some embodiments, the disclosed full-field Brillouin microscopy setup can be integrated with other imaging modalities, for example, to provide simultaneous imaging of co-registered portions of the sample 502. For example, FIG. 5B illustrates a microscope system 570 that further includes a light-sheet fluorescence assembly 572. For example, the light-sheet fluorescence assembly 572 can include a light source (not shown) that provides excitation light 574 (e.g., another laser beam), a mirror 576, and another microscope objective 578. In operation, the light 574 is reflected by mirror 576 into microscope objective 578 to illuminate the sample 502. Both the excitation light beam 574 and the interrogating light beam 522 can share the same imaging plane within the sample 502. A fluorescence detection path 580 may be orthogonal to the illumination path. The integration of the light-sheet Brillouin microscope with co-localized light-sheet fluorescence can be used to identify regions for investigation by Brillouin imaging, for example, by providing morphological information of cells, tissues, and biomaterials.

Figure 5C:
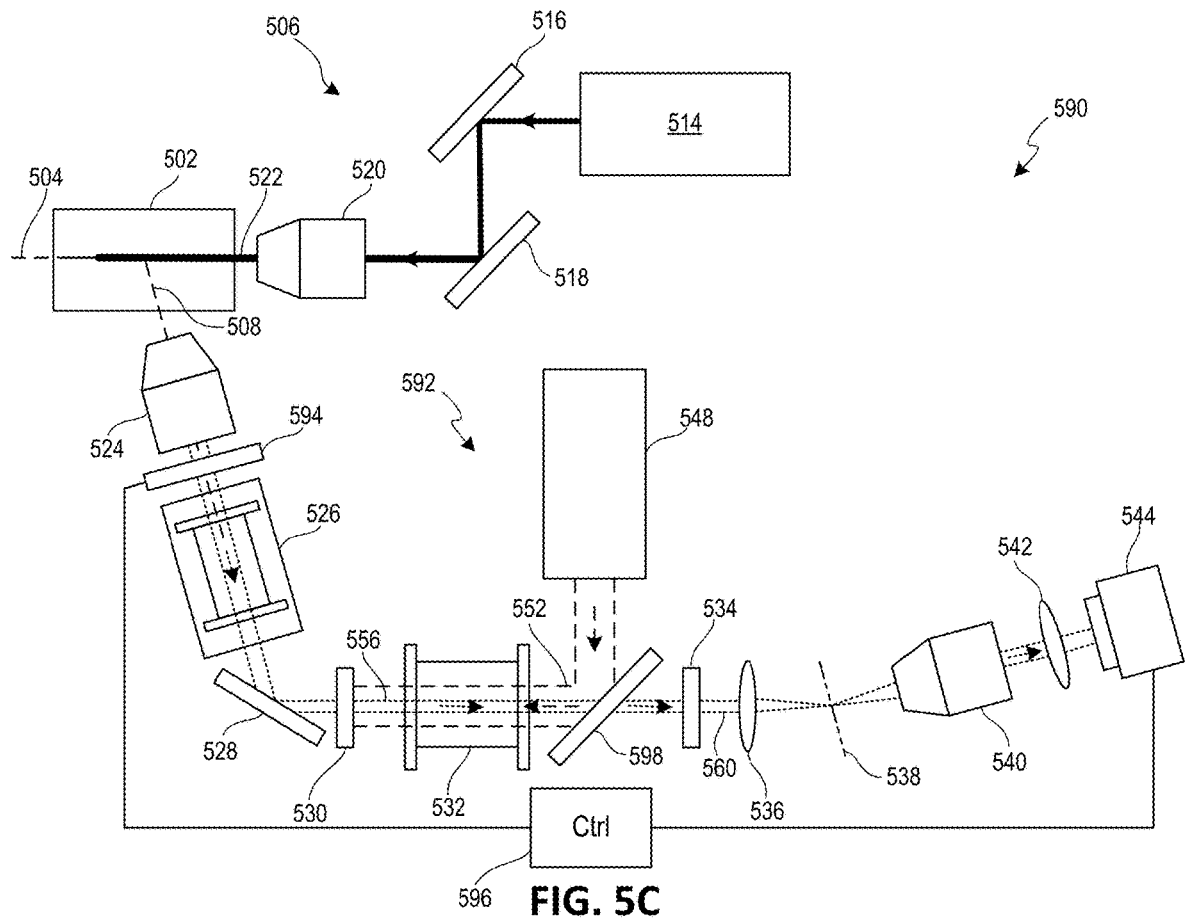
FIG. 5C shows another exemplary full-field Brillouin microscope system employing demodulation, according to one or more embodiments of the disclosed subject matter.

Although FIGS. 5A-5B illustrate a propagation direction of the pumping light 552 within the vapor cell 532 being skewed with respect to the propagation direction of the collected light 556, it is also possible for the pumping light 552 to be directed through the vapor cell 532 in a direction counter-propagating to and substantially colinear with the collected light 556, for example, in a manner similar to that described above with respect to FIG. 4A. For example, FIG. 5C illustrates a microscope system 590 where pumping assembly 592 provides counter-propagating and aligned pumping light 552 through the vapor cell 532 via beam splitter 598. In such a configuration, back-reflection of the pumping light 552 from the vapor cell 532 may be a concern. In such embodiments (or in any of the disclosed embodiments), a modulator 594 can be disposed in the optical path of the detection assembly, for example, between the detection objective 524 and the notch filter 526. The modulator 594 can be an acousto-optic modulator, a chopper, or any other type of optical modulation device known in the art. A controller 596 operatively coupled to the modulator 594 and the electro-optical sensor 544 can use signals therefrom to eliminate, or at least reduce, background noise in the optical signal detected by the electro-optical sensor 544. For example, in some embodiments, controller 596 may be a lock-in amplifier that only reads optical signals detected at the frequency modulated by the modulator 594. Alternatively or additionally, in some embodiments, controller 596 can employ other demodulation techniques to remove or reduce background noise from the signal detected by the electro-optical sensor 544.

Figure 5D:
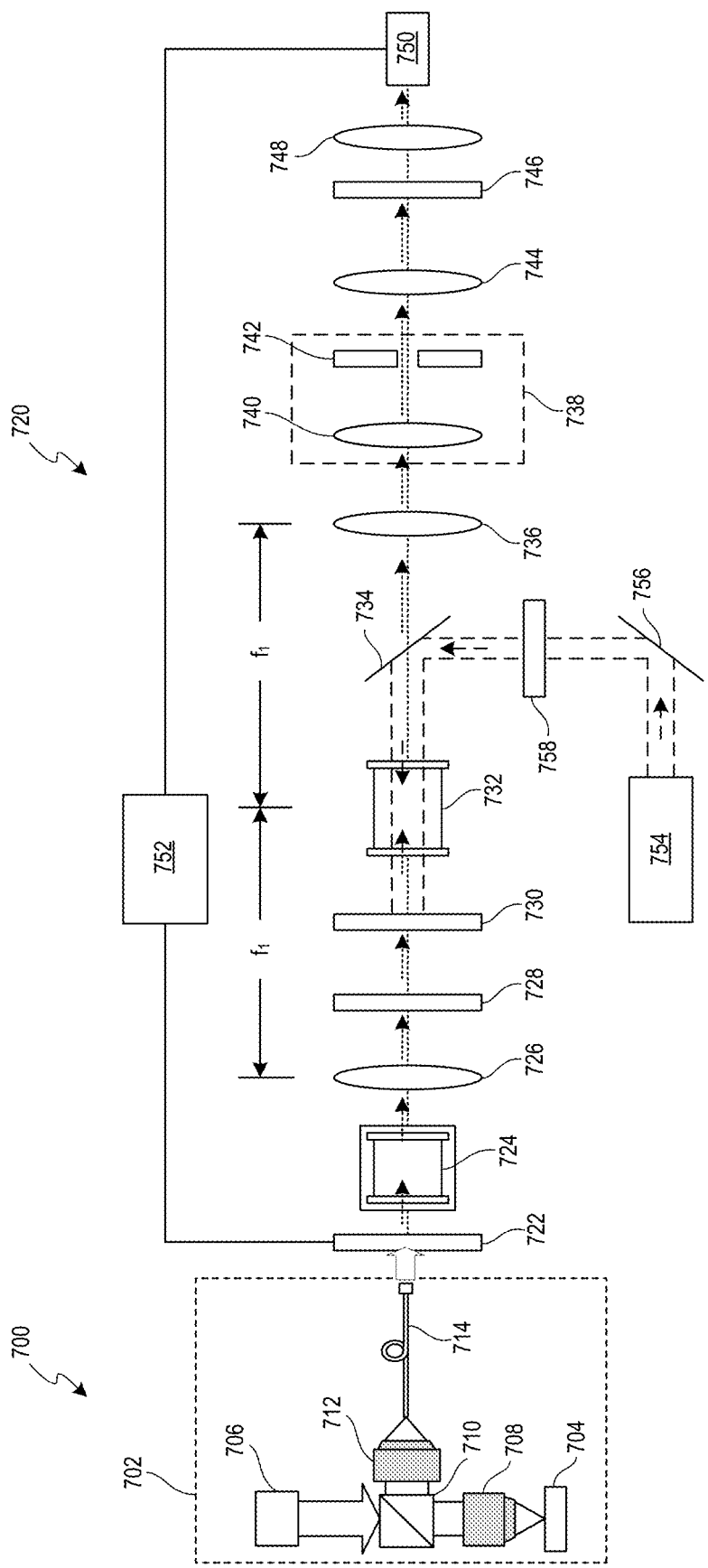
FIG. 5D shows an exemplary single-point Brillouin microscope system, according to one or more embodiments of the disclosed subject matter.

Although the discussion above has primarily focused on full-field Brillouin microscopy, the spectrally-selective assembly can be applied to advantage in point-to-point analysis systems as well. For example, FIG. 5D illustrates an exemplary system 700 for performing single-point Brillouin microscopy. The system 700 can include a microscope setup 702 (e.g., a conventional confocal microscopy setup) and a detection optical assembly 720. For example, the microscope setup 702 can include a light source 706 (e.g., laser) for providing interrogating light, a beam splitter 710, a microscope objective 708, objective lens 712, and a single-mode fiber 714. For example, the detection optical assembly 720 can include a modulator 722, a notch filter 724 (e.g., $^{85}$Rb vapor cell), one or more input polarization optical elements (e.g., a half-wave plate 728 and a Glan-Taylor polarizer 730), an LICD filter 732 (e.g., $^{87}$Rb vapor cell), a beam splitter 734, one or more imaging lenses (e.g., lenses 726, 736, 744, and 748), a spatial filter 738 (e.g., comprising lens 740 and pinhole 742), one or more output polarization optical elements (e.g., Glan-Taylor polarizer 746, having an orientation orthogonal to polarizer 730), and electro-optical sensor 750 (e.g., a silicon photomultiplier, a photomultiplier tube (PMT), a single-photon avalanche diode (SPAD), etc.).

In operation, a single frequency laser beam from interrogating light source 706 can be focused on the sample 704 by objective 708. In an epi-detection configuration, the light scattered from the sample 704 can be collected by the microscope objective 708 and coupled into a single-mode fiber 714 via the beam splitter 710 and another objective lens 712. An output end of the single-mode fiber 714 can include a lens for directing and collimating the light from the sample 704 into the detection assembly 720. The collected light can be modulated by modulator 722 (e.g., chopper, acousto-optic modulator, etc.) and passed through the notch filter 526 to remove stray light components at the frequency of the interrogating light. Imaging lens 726 focuses the light from the notch filter 526 through half-wave plate 728 and Glan-Taylor polarizer 730 into the LICD filter 732. At a same time, pump beam can be directed from pumping light source 754 via mirror 756, quarter wave plate 758, and beam splitter 734 to illuminate the gas in the LICD filter 732 to define a narrow transmission window therein corresponding to the frequency of Brillouin-scattered light to be detected. The light from the LICD filter 732 can proceed to lens 736 via beam splitter 734, where lens 736 can recollimate the beam. The recollimated beam can then be focused by lens 740 through the pinhole 742 and can be recollimated by lens 744 before passing through Glan-Taylor polarizer 746. The output from the polarizer 746 can be focused by lens 748 onto the electro-optical sensor 750.

In the illustrated example, a lock-in amplifier 752 (or other demodulation technique) can be used to read only the signal detected at the electro-optical sensor 750 that has the modulated frequency introduced by modulator 722, so as to eliminate or at least reduce background noise in the detected signal. Alternatively or additionally, the spatial filter 738 can provide some measure of background noise reduction, at least with respect to pump light back-reflection. For example, the pump light beam may be collimated, while the light beam emerging from the output end of the LICD filter 732 may be diverging. Passing the light through lens 736 reverses the beam configurations—that is, any pump beam back-reflection would be converted from collimated to focused, while the desired Brillouin-scattered light signal would be converted from focused to collimated. The configuration again gets reversed by lens 740, such that the Brillouin-scattered light signal is focused to pass through the pinhole 742, while the now-collimated pump beam back-reflection is effectively blocked by the pinhole 742.

Figure 6:
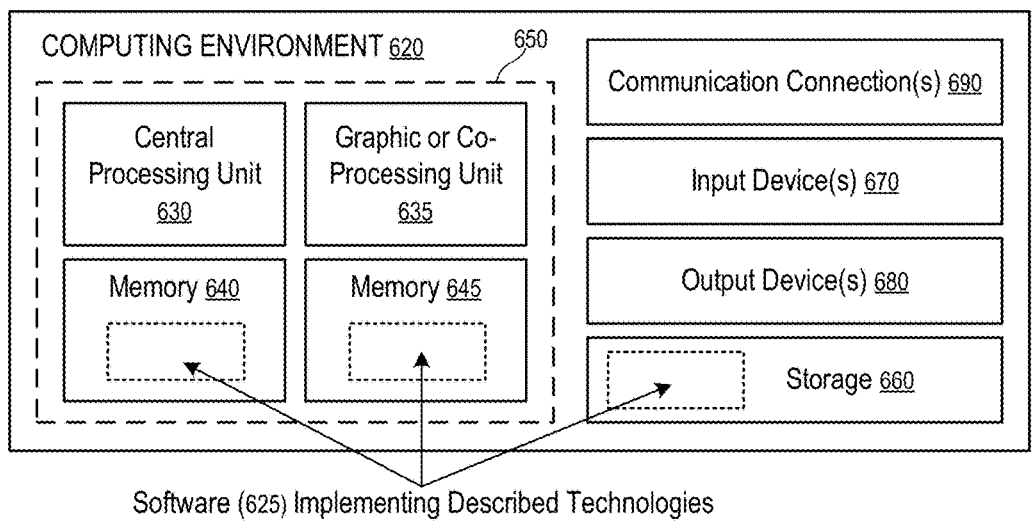
FIG. 6 depicts a generalized example of a computing environment in which the disclosed technologies may be implemented.

FIG. 6 depicts a generalized example of a suitable computing environment 620 in which the described innovations may be implemented, such as aspects of a full-field microscopy method for detection of Brillouin-scattered light, controller 234, controller 256, controller 596 (e.g., demodulator or lock-in amplifier), and/or demodulator 752. The computing environment 620 is not intended to suggest any limitation as to scope of use or functionality, as the innovations may be implemented in diverse general-purpose or special-purpose computing systems. For example, the computing environment 620 can be any of a variety of computing devices (e.g., desktop computer, laptop computer, server computer, tablet computer, etc.). In some embodiments, the computing environment 620 is an integral part of an optical imaging system (e.g., microscope). Alternatively, in some embodiments, the computing environment 620 is a separate system connected to the optical imaging system, for example, by making operative electrical connections (e.g., wired or wireless) to the optical imaging system or components thereof.

With reference to FIG. 6, the computing environment 620 includes one or more processing units 630, 635 and memory 640, 645. In FIG. 6, this basic configuration 650 is included within a dashed line. The processing units 630, 635 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 630 as well as a graphics processing unit or co-processing unit 635. The tangible memory 640, 645 may be volatile memory (e.g., registers, cache, RAM), non-volatile memory (e.g., ROM, EEPROM, flash memory, etc.), or some combination of the two, accessible by the processing unit(s). The memory 640, 645 stores software 625 implementing one or more innovations described herein, in the form of computer-executable instructions suitable for execution by the processing unit(s).

A computing system may have additional features. For example, the computing environment 620 includes storage 660, one or more input devices 670, one or more output devices 680, and one or more communication connections 690. An interconnection mechanism (not shown) such as a bus, controller, or network interconnects the components of the computing environment 620. Typically, operating system software (not shown) provides an operating environment for other software executing in the computing environment 620, and coordinates activities of the components of the computing environment 620.

The tangible storage 660 may be removable or non-removable, and includes magnetic disks, magnetic tapes or cassettes, CD-ROMs, DVDs, or any other medium which can be used to store information in a non-transitory way, and which can be accessed within the computing environment 620. The storage 660 can store instructions for the software 625 implementing one or more innovations described herein.

The input device(s) 670 may be a touch input device such as a keyboard, mouse, pen, or trackball, a voice input device, a scanning device, or another device that provides input to the computing environment 620. The output device(s) 680 may be a display, printer, speaker, CD-writer, or another device that provides output from the computing environment 620.

The communication connection(s) 690 enable(s) communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart-phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Python, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Fabricated Examples and Experimental Results

Figure 7A:
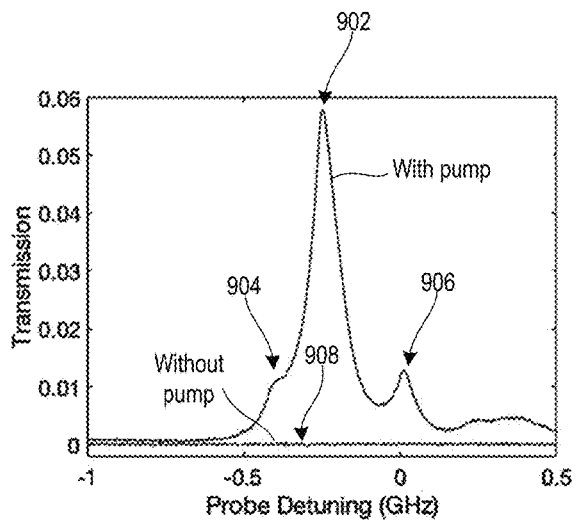
FIG. 7A is a graph of transmission spectrum of $^{87}$Rb gas illuminated by pumping light at the $5^2S_{1/2}(F=2) \rightarrow 5^2P_{3/2}$ (F'=3) transition.
Figure 7B:
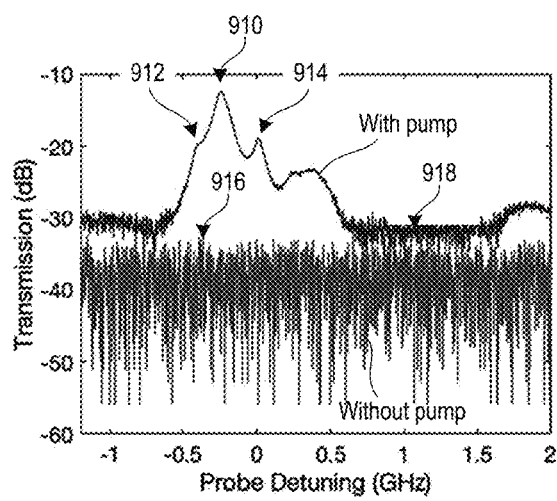
FIG. 7B shows the transmission spectrum of FIG. 3A converted into decibel units (dB).

FIG. 7A-7B illustrate transmission and extinction characteristics of an LICD filter employing an Rb vapor cell. To perform experiments that are relevant for Brillouin analysis, the power of a probe light beam was kept very low (e.g., like Brillouin signals). The probe light beam thus does not affect the atomic vapor, while the power of the pump beam is above saturation level. A vapor cell containing Rb gas was heated to 80° C. The pump beam was locked inside the $^{87}$Rb F=2 band at the $5^2S_{1/2}(F=2) \rightarrow 5^2P_{3/2}(F'=3)$ hyperfine transition, while the probe beam frequency was swept within the same band.

FIG. 7A shows the resulting transmission spectrum of the LICD filter. The x-axis was defined as the probe frequency detuning with respect to the locked pump frequency. The transmission of the LICD filter was defined as the ratio between the output intensity of the filter, I, measured with the setup of FIG. 4A, and the input intensity of the filter, $I_0$, as measured without the pump beam and after removing the Rb vapor cell 414 and the crossed polarizer 424 from the setup of FIG. 4A. The transmission spectrum of the LICD filter has three peaks 904, 902, 906 corresponding to the $^{87}$Rb transitions $5^2S_{1/2}(F=2) \rightarrow 5^2P_{3/2}(F'=1,2,3)$, respectively. Transmission by the LICD filter can be greater than or equal to 1%, for example, typically on the ~10% level.

In FIG. 7A, the peak corresponding to the transition $5^2S_{1/2}(F=2) \rightarrow 5^2P_{3/2}(F'=3)$ 906 was transmitted due to saturated absorption induced by the pump. The other two peaks, 904 and 902, corresponding to the transitions $5^2S_{1/2}(F=2) \rightarrow 5^2P_{3/2}(F'=1,2)$, were present due to the transition forbidden rules for σ-transitions, which states that the σ⁺ (σ⁻) component of the linearly polarized light is absorbed only when Δm=+1(−1), as shown in FIG. 3E. The transmission peak corresponding to the transition $^{87}$Rb $5^2S_{1/2}(F=2) \rightarrow 5^2P_{3/2}(F'=2)$ 902 is higher than the peak corresponding to the transition $5^2S_{1/2}(F=2) \rightarrow 5^2P_{3/2}(F'=3)$ 904. This difference in probe transmission strength can be attributed to the magnitude of the Clebsch-Gordan coefficients of the hyperfine dipole matrix, where the coefficient for the transition $5^2S_{1/2}(F=2) \rightarrow 5^2P_{3/2}(F'=2)$ 902 is greater in magnitude than the coefficient for the transition $5^2S_{1/2}(F=2) \rightarrow 5^2P_{3/2}(F'=3)$ 904 ($-\sqrt{1/12}$ and $\sqrt{1/30}$, respectively). When the pump is blocked, the probe is fully absorbed, as shown at 908.

In FIG. 7B, the probe transmission spectrum from FIG. 7A has been converted into decibel units (dB), which was defined as $dB_{filter} = -10 \log_{10}(I/I_0)$. The x-axis is as defined with respect to FIG. 7A. In FIG. 7B, the peaks 912, 910, 914 correspond to the $^{87}$Rb transitions $5^2S_{1/2}(F=2) \rightarrow 5^2P_{3/2}(F'=1,2,3)$, respectively. The extinction of the LICD filter was calculated by subtracting the decibel value of the noise 918 from the decibel value of the peak with the highest transmission peak 910. The LICD filter can exhibit an extinction of at least 20 dB, for example, >30 dB.

Figure 8A:
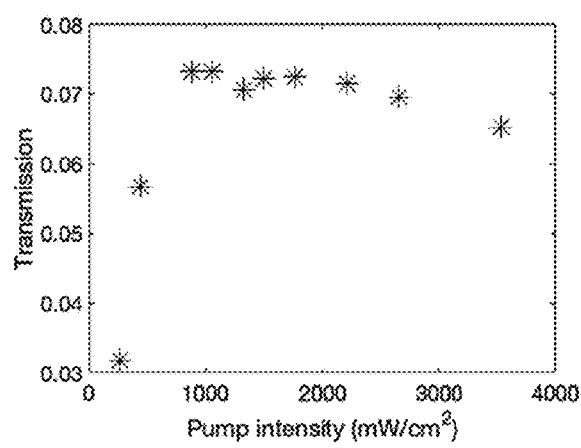
FIG. 8A is a graph of the transmission at the $5^2S_{1/2}(F=2) \rightarrow 5^2P_{3/2}(F'=2)$ transition of $^{87}$Rb gas, illuminated by pumping light at the $5^2S_{1/2}(F=2) \rightarrow 5^2P_{3/2}(F'=2)$ transition, as a function of intensity of the pumping light.
Figure 8B:
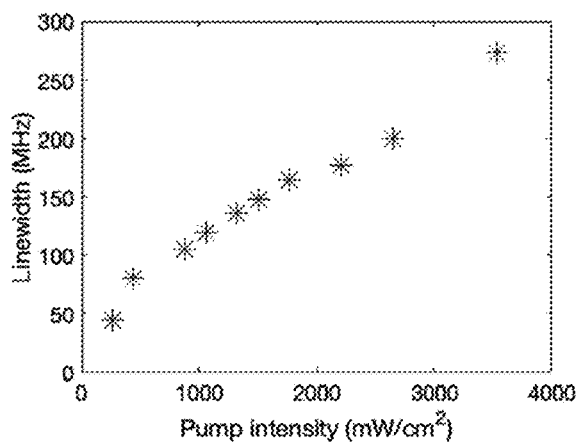
FIG. 8B is a graph of linewidth of the transmission peak at the $5^2S_{1/2}(F=2) \rightarrow 5^2P_{3/2}(F'=2)$ transition of $^{87}$Rb gas, illuminated by pumping light at the $5^2S_{1/2}(F=2) \rightarrow 5^2P_{3/2}$ (F'=2) transition, as a function of intensity of the pumping light.

FIGS. 8A-8B illustrate how the pump power affects the transmission and linewidth of the LICD filter. In this experiment, the probe power was kept constant, the temperature of the Rb vapor cell was set to 80° C., and the pump beam was locked at the transition $5^2S_{1/2}(F=2) \rightarrow 5^2P_{3/2}(F'=3)$. FIG. 8A shows the transmission of the LICD filter at the transition $5^2S_{1/2}(F=2) \rightarrow 5^2P_{3/2}(F'=2)$ (peak 902 in FIG. 7A) as a function of the pump power. Because the purpose of the pump beam is to saturate the Rb atoms interacting with the probe beam, the pump power was significantly higher than the saturation intensity for an $^{87}$Rb $D_2$ line, e.g., $I_{sat}$=1.669 mW/cm². As the pump power increases, the probe transmission increases until the transmission eventually saturates.

FIG. 8B shows how the linewidth of the transmission peak $5^2S_{1/2}(F=2) \rightarrow 5^2P_{3/2}(F'=2)$ (peak 902 in FIG. 7A) is affected by the pump power. The linewidth was determined by the full width at half-maximum (FWHM) of the peak. The linewidth increases as the pump power increases due to the power broadening effect. The linewidth of a transition is related to the lifetime of that transition (e.g., ~26 ns for Rb $D_2$ lines). A pump beam with a power $I_{sat}$ creates an equal population of the $^{87}$Rb atoms in the ground state and in the excited state. However, the $^{87}$Rb spends more time in the excited state when the pump power is much greater than $I_{sat}$, increasing the lifetime of the transition.

Figure 9A:
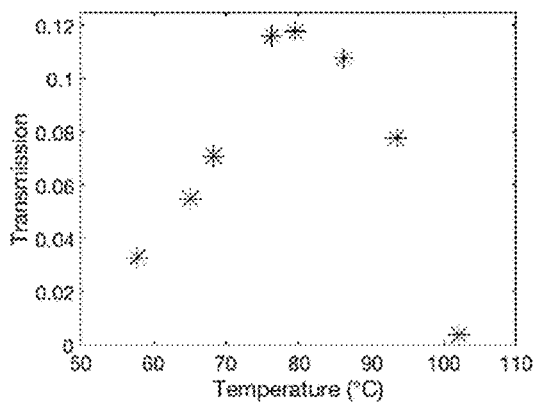
FIG. 9A is a graph of transmission at the $5^2S_{1/2}(F=2) \rightarrow 5^2P_{3/2}(F'=2)$ transition of $^{87}$Rb gas, illuminated by pumping light at the $5^2S_{1/2}(F=2) \rightarrow 5^2P_{3/2}(F'=2)$ transition, as a function of temperature of the gas.
Figure 9B:
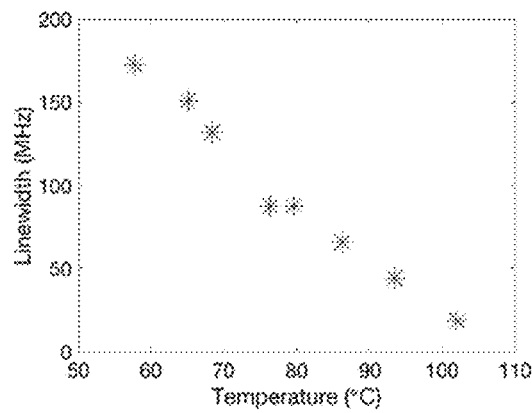
FIG. 9B is a graph of linewidth of the transmission peak at the $5^2S_{1/2}(F=2) \rightarrow 5^2P_{3/2}(F'=2)$ transition of $^{87}$Rb gas, illuminated by pumping light at the $5^2S_{1/2}(F=2) \rightarrow 5^2P_{3/2}$ (F'=2) transition, as a function of temperature of the gas.
Figure 9C:
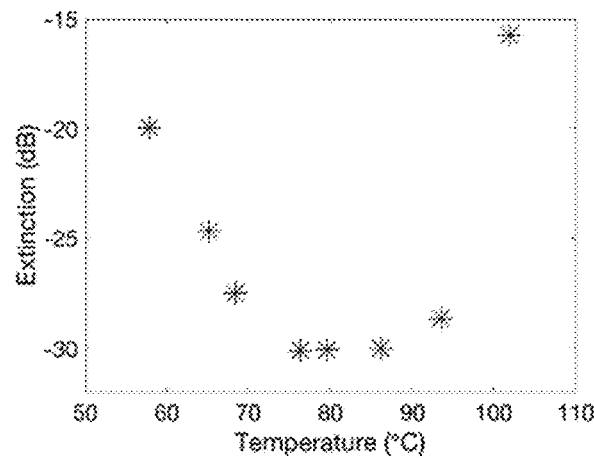
FIG. 9C is a graph of extinction of the $^{87}$Rb gas as a function of temperature of the gas.

FIGS. 9A-9C illustrate how the temperature of the Rb vapor cell affects transmission, linewidth, and extinction of the LICD filter. In this experiment, a pump power of 3.75 mW was used (e.g., 165 mW/cm²), and the pump was locked at the transition $5^2S_{1/2}(F=2) \rightarrow 5^2P_{3/2}(F'=3)$. The temperature of the cell was detected using an external temperature sensor placed in contact with the glass at the middle of the Rb vapor cell. FIG. 9A shows the transmission of the filter at the transition $5^2S_{1/2}(F=2) \rightarrow 5^2P_{3/2}(F'=2)$ (peak 902 in FIG. 7A) as a function of temperature. As shown in FIG. 9A, increases in temperature yielded an increase in transmission up to a maximum transmission around 80° C. The decrease in peak transmission for temperatures greater than 80° C. is due to the attenuation of the pump beam as it propagates throughout the length of the cell, as explained by Beer's law.

FIG. 9B shows the linewidth of the transmission peak $5^2S_{1/2}(F=2) \rightarrow 5^2P_{3/2}(F'=2)$ (peak 902 in FIG. 7A) as a function of the temperature of the Rb vapor cell. The linewidth decreases as the temperature of the cell increases. This is due to an increase in the number of Rb atoms crossing through the probe and the pump beams, thereby improving the peak-narrowing process of the filter. FIG. 9C shows the filter extinction as a function of the temperature of the Rb vapor cell. The extinction was calculated as discussed above with respect to FIG. 7B. As the temperature of the cell increases, the extinction improves, reaching a maximum value of about 30 dB around 80° C. Absorption of probe laser frequencies out of resonance with the pump beam are absorbed more as the temperature of the cell increases. The extinction decreases for temperatures greater than 80° C. for the same reason that the transmission decreases.

Figure 10A:
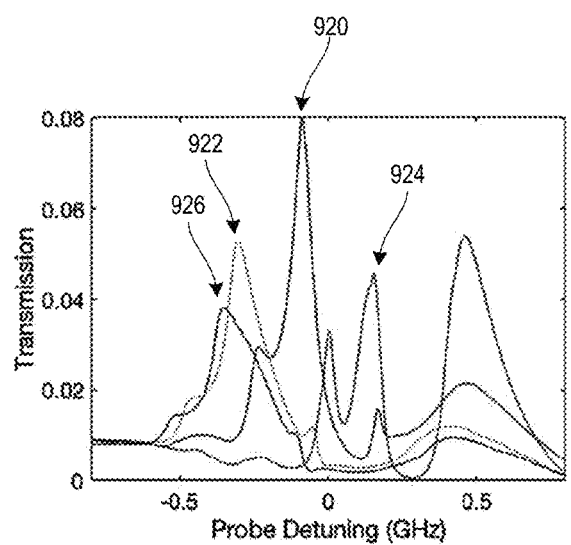
FIG. 10A is a graph of transmission spectra of $^{87}$Rb gas illuminated by pumping light locked at different frequencies within the Doppler-broadened $^{87}$Rb F=2 band.
Figure 10B:
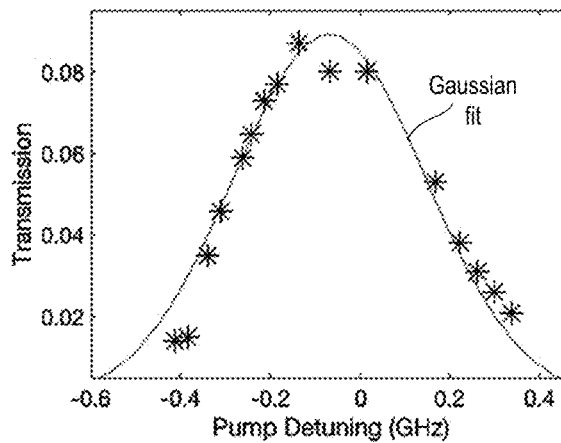
FIG. 10B is a graph of transmission at the $5^2S_{1/2}$(F=2) →$5^2P_{3/2}$(F'=2) transition of $^{87}$Rb gas as a function of pump detuning from the transition of $5^2S_{1/2}$(F=2)→$5^2P_{3/2}$(F'=3).

FIGS. 10A-10B illustrate the tunability of the LICD filter, for example, by tuning the frequency of the pump beam. In this experiment, probe and pump powers, as well as temperature, were kept constant as described above with respect to FIGS. 9A-9C. FIG. 10A shows the different transmission spectra of the probe beam when the pump was locked at different frequencies inside the Doppler-broadened $^{87}$Rb F=2 band. The x-axis represents the probe frequency detuning from the transition $5^2S_{1/2}(F=2) \rightarrow 5^2P_{3/2}(F'=3)$. By following the peak corresponding to the $5^2S_{1/2}(F=2) \rightarrow 5^2P_{3/2}(F'=2)$ transition, it can be seen that detuning the pump changes the magnitude and frequency of the transmission peaks 920-926. When the probe beam travels through the Rb vapor, the different Rb atoms are traveling at different velocities with respect to the probe beam. When the pump beam is counterpropagating with the probe beam off resonance, the reference frame of the atoms is different with respect to each beam. Atoms traveling in the cell will either see the beams red-shifted or blue-shifted unless the two beams are on resonance with each other. When the beams are on resonance, atoms traveling perpendicularly to the lasers (zero velocity atoms) see atoms at the frequency where the two beams are locked, thereby saturating the atoms at that frequency and allowing for the probe to be transmitted through the LICD filter. Detuning the pump frequency allows the atoms to see the beams slightly blue- or red-shifted, but will still be saturated nonetheless. Transmission will still occur, but maximum transmission occurs at probe frequencies with the greatest optical density in the Doppler-broadened configuration.

FIG. 10B shows the probe transmission of the peak corresponding to the transition $5^2S_{1/2}(F=2) \rightarrow 5^2P_{3/2}(F'=2)$ as a function of the pump detuning from the transition $5^2S_{1/2}(F=2) \rightarrow 5^2P_{3/2}(F'=3)$. Detuning the pump transmits different frequencies of the probe, allowing measurement of the full scanning range of the LICD filter. The tuning range of the LICD filter is a Doppler-width of an Rb $D_2$ transition, which is ~500 MHz. The FWHM of the Gaussian fit used to analyze the data was 539 MHz. It is possible to use a different vapor species in order to increase the tunable range of the cell.

Accordingly, an atomic vapor cell can be used as an LICD filter with a narrowband (e.g., ≤200 MHz, for example, <100 MHz), high throughput (e.g., at least 1%, for example, ~10%), good extinction (e.g., ≥20 dB, for example, ~30 dB, upgradeable to >80 dB with absorptive gas cells for probe beam absorption), and large tuning range (e.g., ~500 MHz).

FIG. 11 illustrates the schematic of the experimental setup 800 used to characterize image transmission performances of the LICD filter using a 4f imaging system. The probe beam propagates through an USAF-1951 resolution test chart 802 for imaging. The beam was focused with an aspherical lens 804 that has a focal length $f_{804}$=200 mm. The intensity of the probe beam was controlled with an attenuator in the form of a half-wave plate 410 and a Glan-Taylor polarizer 412. The probe beam propagated through the Rb vapor cell 414, which was heated at its windows using ceramic heaters connected to a heater controller 418. The pump beam from laser source 428 propagates through an attenuator, in the form of a half-wave plate 432 and a linear polarizer 434. The pump beam was then reflected by a mirror 436 into a quarter-wave plate 438 that was oriented to create a $\sigma^+$ circularly polarized pump beam. The pump beam was reflected by a 10:90 beam splitter 422 into the Rb vapor cell 414 in order to overlap at 180° with the probe beam. The probe beam propagates through the beam splitter 422 and through a linear polarizer 424 in crossed configuration with the Glan-Taylor polarizer 412. After being transmitted through the linear polarizer 424, the probe beam was collimated using a second aspherical lens 806 of focal length $f_{806}$=200 mm, placed at a distance $f_1+f_2$ from the first aspherical lens 804 in order to create a 4f-system. An image of the USAF-1951 resolution test chart was created at the electro-optical sensor 426 (e.g., camera), placed a focal length away from the aspherical lens 806.

For image acquisition, the probe beam power was held constant at 15 μW, the pump beam power was kept constant at 4 mW, and the temperature of the Rb vapor cell 414 was held at 80° C. FIG. 12A shows a raw image of elements 2 and 3 of group 2 of the USAF-1951 resolution test chart 802. The image was taken by removing the Rb vapor cell 414 and the second linear polarizer 424 from the setup of FIG. 11, and without the pump beam from laser source 428, in order to collect all the transmitted linearly polarized probe light. The probe beam was locked at the $^{87}$Rb $5^2S_{1/2}(F=2) \rightarrow 5^2P_{3/2}(F'=3)$. From this experiment, the field of view (FOV) of the optical system was estimated to be 1.473 mm².

FIG. 12B shows the image obtained by the setup of FIG. 11 with Rb vapor cell 414 and second linear polarizer 424 in place, but still without the pump beam from laser source 428. The probe beam was locked at the $^{87}$Rb $5^2S_{1/2}(F=2) \rightarrow 5^2P_{3/2}(F'=3)$, as in FIG. 12A. However, there is no image transmission because the second linear polarizer 424 was crossed with the Glan-Taylor polarizer 412 and the vapor cell 414 absorbs the probe beam.

FIG. 12C shows the image obtained by the setup of FIG. 11 when superimposing the c circularly polarized pump locked at $^{87}$Rb $5^2S_{1/2}(F=2) \rightarrow 5^2P_{3/2}(F'=3)$ (e.g., the same transition that the probe is locked at). There is image transmission through the second linear polarizer 424 because the probe experiences polarization rotation due to Rb vapor cell 414. The estimated image FOV was estimated to be 1.263 mm². The blurring in the image was the result of the beam diameter of the pump laser. The pump beam will only create a transparent window for the probe beam in the space it is confined to. Thus, the effect resembles transmitting an image through a small pinhole, which decreases the effective numerical aperture of the imaging system.

FIG. 12D shows the image obtained by the setup of FIG. 11 when beams are detuned off resonance. The probe beam remains locked at the $^{87}$Rb $5^2S_{1/2}(F=2) \rightarrow 5^2P_{3/2}(F'=3)$ whereas the pump beam is locked inside of the $^{85}$Rb $5^2S_{1/2}(F=3)$ band. In this configuration, the probe beam will not experience polarization rotation due to the Rb vapor cell 414, and so it will be blocked by the crossed polarizer 424. Probe frequencies will only be transmitted at frequencies that the pump beam saturates.

CONCLUSION

Although some of the embodiments described above refer to "imaging," the production of an actual image is not strictly necessary. Indeed, the mentions of "imaging" are intended to include the acquisition of data where an image may not be produced. Accordingly, the use of the term "imaging" herein should not be understood as limiting.

Although particular optical components and configurations have been illustrated in the figures and discussed in detail herein, embodiments of the disclosed subject matter are not limited thereto. Indeed, one skilled in the art will readily appreciate that different optical components or configurations can be selected and/or optical components added to provide the same effect. In practical implementations, embodiments may include additional optical components or other variations beyond those illustrated, for example, additional reflecting elements to manipulate the beam path to fit a particular microscope geometry. Accordingly, embodiments of the disclosed subject matter are not limited to the particular optical configurations specifically illustrated and described herein.

For example, other optical components beyond those specifically illustrated in FIGS. 4A-5D can also be included in the microscope, or its constituent arms or assemblies. Moreover, components different than those illustrated can be used in the microscope, or its constituent arms or assemblies, for example, to achieve the same function using different optical components or to provide a spectrometer of a different function.

Any of the features illustrated or described with respect to FIGS. 2A-12D can be combined with any other features illustrated or described with respect to FIGS. 2A-12D to provide systems, methods, devices, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. A full-field microscopy method for detection of Brillouin-scattered light, comprising:
   (a) illuminating a two-dimensional plane in a sample with interrogating light having a first wavelength;
   (b) collecting light emitted from the two-dimensional plane illuminated by the interrogating light, the emitted light comprising Brillouin-scattered light resulting from interaction of the interrogating light with the sample, the Brillouin-scattered light having a second wavelength shifted from the first wavelength;
   (c) passing the collected light through a spectrally-selective assembly comprising a gas or vapor illuminated by pumping light; and
   (d) detecting, using an electro-optical sensor, light from the spectrally-selective assembly,
   wherein the Brillouin-scattered light from multiple points in the two-dimensional plane in the sample is simultaneously detected by the detecting of (d).

2. The method of claim 1, wherein one or more optical properties of the gas or vapor within the spectrally-selective assembly is changed by illumination with the pumping light.

3. The method of claim 2, wherein the one or more optical properties include absorption, dichroism, polarization, or birefringence.

4. The method of claim 3, wherein the illumination with the pumping light changes dichroism properties for wavelengths corresponding to a ground state or excited states of the gas or vapor.

5. The method of claim 1, wherein the spectrally-selective assembly changes a polarization of the Brillouin-scattered light passing therethrough that has the second wavelength.

6. The method of claim 5, wherein the spectrally-selective assembly includes one or more polarization optical elements that discriminate the Brillouin-scattered light using the changed polarization.

7. The method of claim 1, wherein the pumping light propagates through the gas or vapor in a direction substantially counter to, or at least crossing with, that of the collected light.

8. The method of claim 1, wherein:
   the spectrally-selective assembly is selective for a frequency band of less than or equal to 200 MHz;
   the spectrally-selective assembly has a transmission with respect to the second wavelength of at least 1%;
   the spectrally-selective assembly provides an extinction of at least 20 dB for light having the first wavelength as compared to light having the second wavelength; or
   any combination of the above.

9. The method of claim 1, wherein the spectrally-selective assembly allows a fixed band of wavelengths to pass, and further comprising associating an intensity at each pixel of the electro-optical sensor to a shift of a Brillouin peak.

10. The method of claim 1, wherein a frequency of the Brillouin-scattered light is shifted from that of the interrogating light by less than or equal to 10 GHz.

11. The method of claim 1, wherein the spectrally-selective assembly further comprises another gas or vapor that is not illuminated by pumping light and that absorbs light at the first wavelength.

12. The method of claim 1, wherein the illuminating of (a) comprises forming the interrogating light into a light sheet that simultaneous illuminates multiple points of the two-dimensional plane in the sample.

13. The method of claim 1, wherein the illuminating of (a) is such that the illuminated two-dimensional plane has an area of at least 1 mm$^2$.

14. A full-field microscopy method for detection of Brillouin-scattered light, comprising:
   (a) illuminating a two-dimensional plane in a sample with interrogating light having a first wavelength;
   (b) collecting light emitted from the two-dimensional plane illuminated by the interrogating light, the emitted light comprising Brillouin-scattered light resulting from interaction of the interrogating light with the sample, the Brillouin-scattered light having a second wavelength shifted from the first wavelength;
   (c) passing the collected light through a spectrally-selective assembly comprising a gas or vapor illuminated by pumping light; and
   (d) detecting, using an electro-optical sensor, light from the spectrally-selective assembly,
   wherein the Brillouin-scattered light from multiple points in the two-dimensional plane in the sample is simultaneously detected by the detecting of (d), and
   the method further comprises:
      altering the spectrally-selective assembly by changing a wavelength of the pumping light, a polarization of the pumping light, or both wavelength and polarization of the pumping light; and
      repeating (a) through (d) with the altered spectrally-selective assembly, so as to acquire a Brillouin spectrum for the two-dimensional plane in the sample.

15. The method of claim 14, further comprising:
   for one, some, or each of the points in the two-dimensional plane, extracting at least one property from the acquired Brillouin spectrum, and
   the at least one property includes frequency shift, linewidth, or intensity of the Brillouin-scattered light.

16. A full-field microscopy system for detection of Brillouin-scattered light, comprising:
   a first light source providing interrogating light having a first wavelength;
   an illumination optical assembly comprising one or more lenses and constructed to illuminate a two-dimensional plane in a sample with the interrogating light;
   a detection optical assembly comprising one or more lenses and a spectrally-selective assembly, the detection optical assembly being constructed to pass light emitted from the two-dimensional plane illuminated by the interrogating light through the spectrally-selective assembly, the emitted light comprising Brillouin-scattered light resulting from interaction of the interrogating light with the sample, the Brillouin-scattered light having a second wavelength shifted from the first wavelength, the spectrally-selective assembly comprising a gas or vapor illuminated by pumping light; and an electro-optical sensor that detects light from the spectrally-selective assembly, wherein the Brillouin-scattered light from multiple points in the two-dimensional plane in the sample is simultaneously detected by the electro-optical sensor.

17. The system of claim 16, wherein one or more optical properties of the gas or vapor within the spectrally-selective assembly is changed by illumination with the pumping light.

18. The system of claim 17, wherein the one or more optical properties include absorption, dichroism, polarization, or birefringence.

19. The system of claim 18, wherein the illumination with the pumping light changes dichroism properties for wavelengths corresponding to a ground state or excited states of the gas or vapor.

20. The system of claim 16, wherein the spectrally-selective assembly changes a polarization of light passing therethrough that has the second wavelength.

21. The system of claim 20, wherein the spectrally-selective assembly includes one or more polarization optical elements that discriminate the Brillouin-scattered light using the changed polarization.

22. The system of claim 16, further comprising a controller operatively coupled to at least the electro-optical sensor, the controller comprising one or more processors and computer readable storage media storing computer-readable instructions that, when executed by the one or more processors, cause the one or more processors to generate a Brillouin-scattered light image of the two-dimensional plane in the sample.

23. The system of claim 16, further comprising:

a controller comprising one or more processors and computer readable storage media storing computer-readable instructions that, when executed by the one or more processors, cause the one or more processors to alter the spectrally-selective assembly by changing a wavelength of the pumping light, a polarization of the pumping light, or both wavelength and polarization of the pumping light, so as to acquire a Brillouin spectrum for the two-dimensional plane in the sample.

24. The system of claim 23, wherein the computer readable storage media further stores computer-readable instructions that, when executed by the one or more processors, further cause the one or more processors to:

for one, some, or each of the points in the two-dimensional plane, extract at least one property from the acquired Brillouin spectrum, wherein the at least one property includes frequency shift, linewidth, or intensity of the Brillouin-scattered light.

25. The system of claim 16, wherein the spectrally-selective assembly further comprises another gas or vapor that is not illuminated by pumping light and that absorbs light at the first wavelength.

* * * * *